US012576895B2

(12) United States Patent (10) Patent No.: US 12,576,895 B2
Ono et al. (45) Date of Patent: Mar. 17, 2026

(54) OBSTACLE DETECTION SYSTEM, OBSTACLE DETECTION METHOD, AND SELF-LOCATION ESTIMATION SYSTEM

(71) Applicant: HITACHI, LTD., Tokyo (JP)

(72) Inventors: Yukihiko Ono, Tokyo (JP); Kenji Imamoto, Tokyo (JP); Jun Koike, Tokyo (JP)

(73) Assignee: HITACHI, LTD., Tokyo (JP)

( * ) Notice: Subject to any disclaimer, the term of this patent is extended or adjusted under 35 U.S.C. 154(b) by 650 days.

(21) Appl. No.: 17/927,952

(22) PCT Filed: Apr. 30, 2021

(86) PCT No.: PCT/JP2021/017198
§ 371 (c)(1),
(2) Date: Nov. 28, 2022

(87) PCT Pub. No.: WO2021/251028
PCT Pub. Date: Dec. 16, 2021

(65) Prior Publication Data
US 2023/0202540 A1 Jun. 29, 2023

(30) Foreign Application Priority Data

Jun. 10, 2020 (JP) ................................. 2020-100795

(51) Int. Cl.
B61L 23/04 (2006.01)
B61L 15/00 (2006.01)
(Continued)

(52) U.S. Cl.
CPC ......... B61L 23/041 (2013.01); B61L 15/0072 (2013.01); B61L 25/025 (2013.01);
(Continued)

(58) Field of Classification Search
CPC .. B61L 23/041; B61L 25/025; B61L 15/0072; G01S 17/42; G01S 17/931;
(Continued)

(56) References Cited

U.S. PATENT DOCUMENTS 8,041,079 B2 * 10/2011 Chiu ......................... G06T 7/97
382/104
12,079,721 B2 * 9/2024 Dolberg ................ G06F 18/214
(Continued)

FOREIGN PATENT DOCUMENTS

CN 108297896 A * 7/2018 ............ B61L 23/041
EP 3868631 A1 8/2021
(Continued)

OTHER PUBLICATIONS

International Search Report of PCT/JP2021/017198 dated Jul. 20, 2021.
(Continued)

*Primary Examiner* — Cheng Lin
(74) *Attorney, Agent, or Firm* — MATTINGLY & MALUR, PC

(57) ABSTRACT

An object of the present invention is to provide an obstacle detection system and an obstacle detection method for a trajectory traveling vehicle, which are capable of detecting a front obstacle on a trajectory and around the trajectory with high accuracy. The system includes: a monitoring area setting processing unit that sets an obstacle monitoring area for detecting an obstacle; a front obstacle monitoring unit that monitors an obstacle in the obstacle monitoring area using a sensor that horizontally scans the front of the train; and an obstacle detection unit that detects an obstacle in the obstacle monitoring area based on a monitoring result by the front obstacle monitoring unit, in which the front obstacle monitoring unit complements a gap in a detection region of
(Continued)

the sensor at a first position with a detection region of the sensor while the train moves from the first position to a second position.

10 Claims, 29 Drawing Sheets

(51) Int. Cl.

| | |
|---|---|
| *B61L 25/02* | (2006.01) |
| *G01S 5/00* | (2006.01) |
| *G01S 17/42* | (2006.01) |
| *G01S 17/931* | (2020.01) |
| *G06V 20/58* | (2022.01) |
| *G01S 13/87* | (2006.01) |
| *G01S 13/931* | (2020.01) |

(52) U.S. Cl.
CPC ................ *G01S 5/00* (2013.01); *G01S 17/42* (2013.01); *G01S 17/931* (2020.01); *G06V 20/58* (2022.01); *G01S 13/876* (2013.01); *G01S 2013/93271* (2020.01); *G01S 2013/9328* (2013.01)

(58) Field of Classification Search
CPC ......... G01S 13/876; G01S 2013/93271; G01S 2013/9328; G06V 20/58
See application file for complete search history.

(56) References Cited

U.S. PATENT DOCUMENTS

| | | | |
|---|---|---|---|
| 2008/0019567 A1* | 1/2008 | Takagi ................... | G06V 20/58 |
| | | | 382/103 |
| 2011/0202247 A1* | 8/2011 | Takeoka ................ | G05D 1/024 |
| | | | 701/70 |
| 2016/0146941 A1 | 5/2016 | Hassenpflug et al. | |
| 2017/0168146 A1* | 6/2017 | Boehmke ............. | G01S 7/4814 |

FOREIGN PATENT DOCUMENTS

| | | | | | |
|---|---|---|---|---|---|
| JP | H05126955 | A | * | 5/1993 | |
| JP | 2008-026997 | A | | 2/2008 | |
| JP | 2013-015338 | A | | 1/2013 | |
| JP | 2016088183 | A | * | 5/2016 | |
| JP | 2020062899 | A | * | 4/2020 | ........... B61L 23/041 |

OTHER PUBLICATIONS

Extended European Search Report received in corresponding European Application No. 21822778.3 dated Jun. 14, 2024.

* cited by examiner

FIG. 4
(A) Failure of Grouping
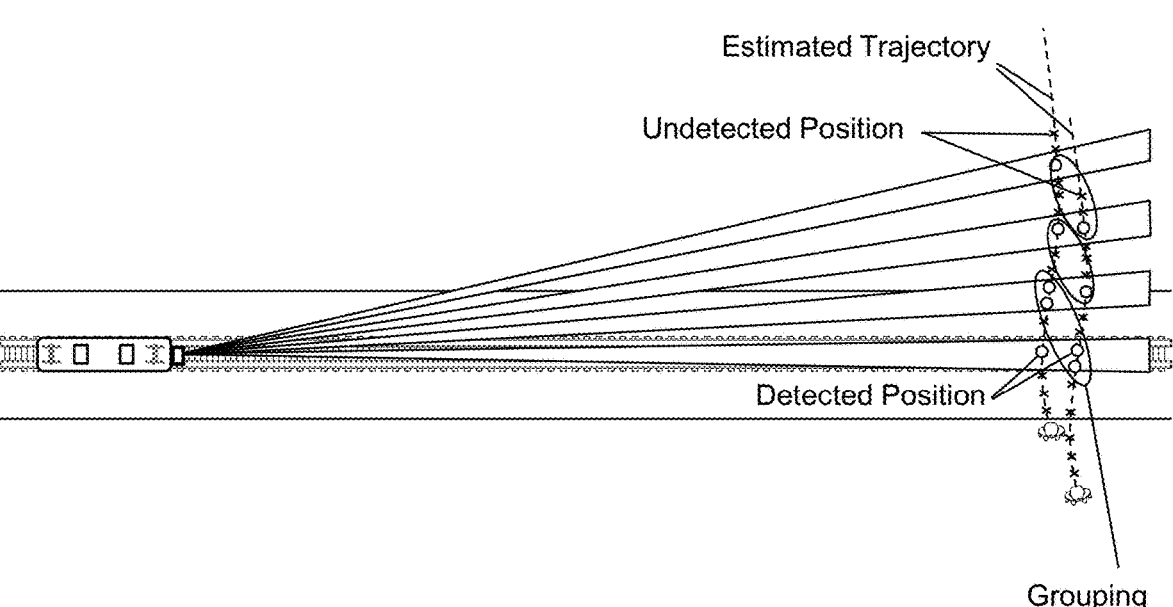
(B) Failure of Tracking
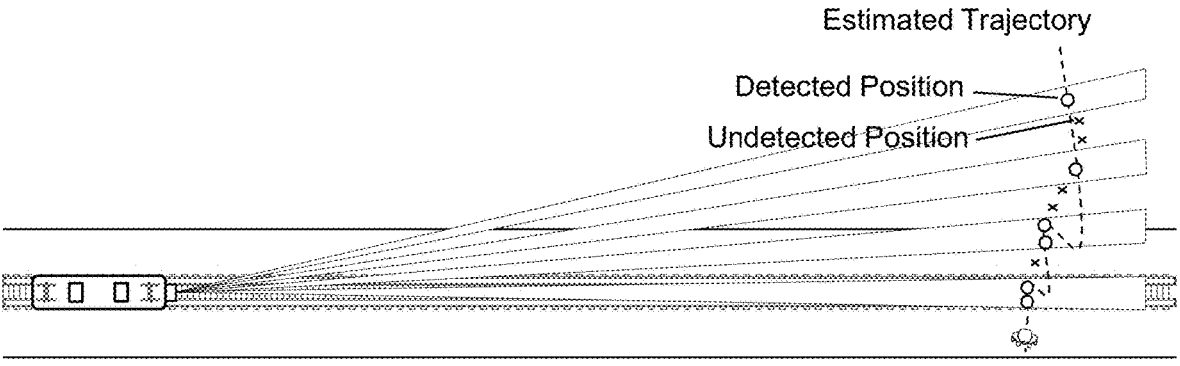

(a) Use of LIDAR with high angle resolution (b) Use of another LIDAR

FIG. 16
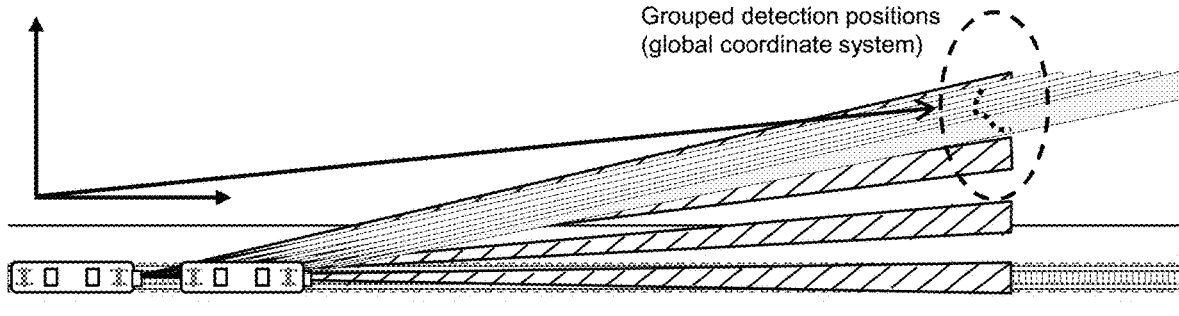
Grouped detection positions
(global coordinate system)
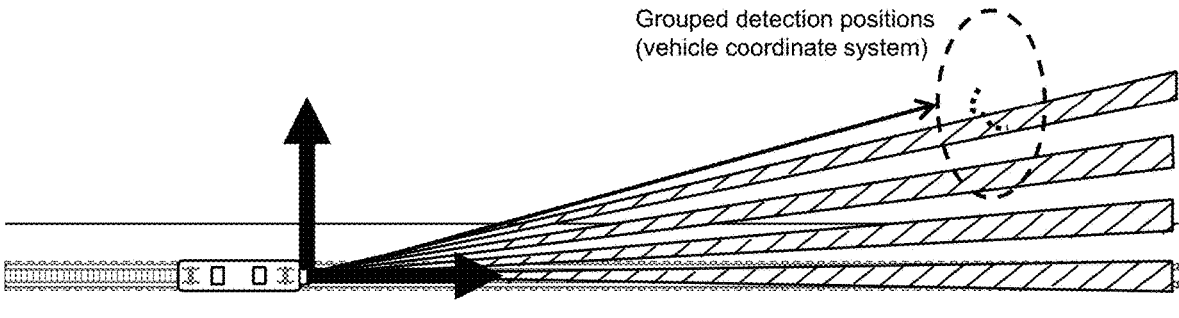
Grouped detection positions
(vehicle coordinate system)

FIG. 17

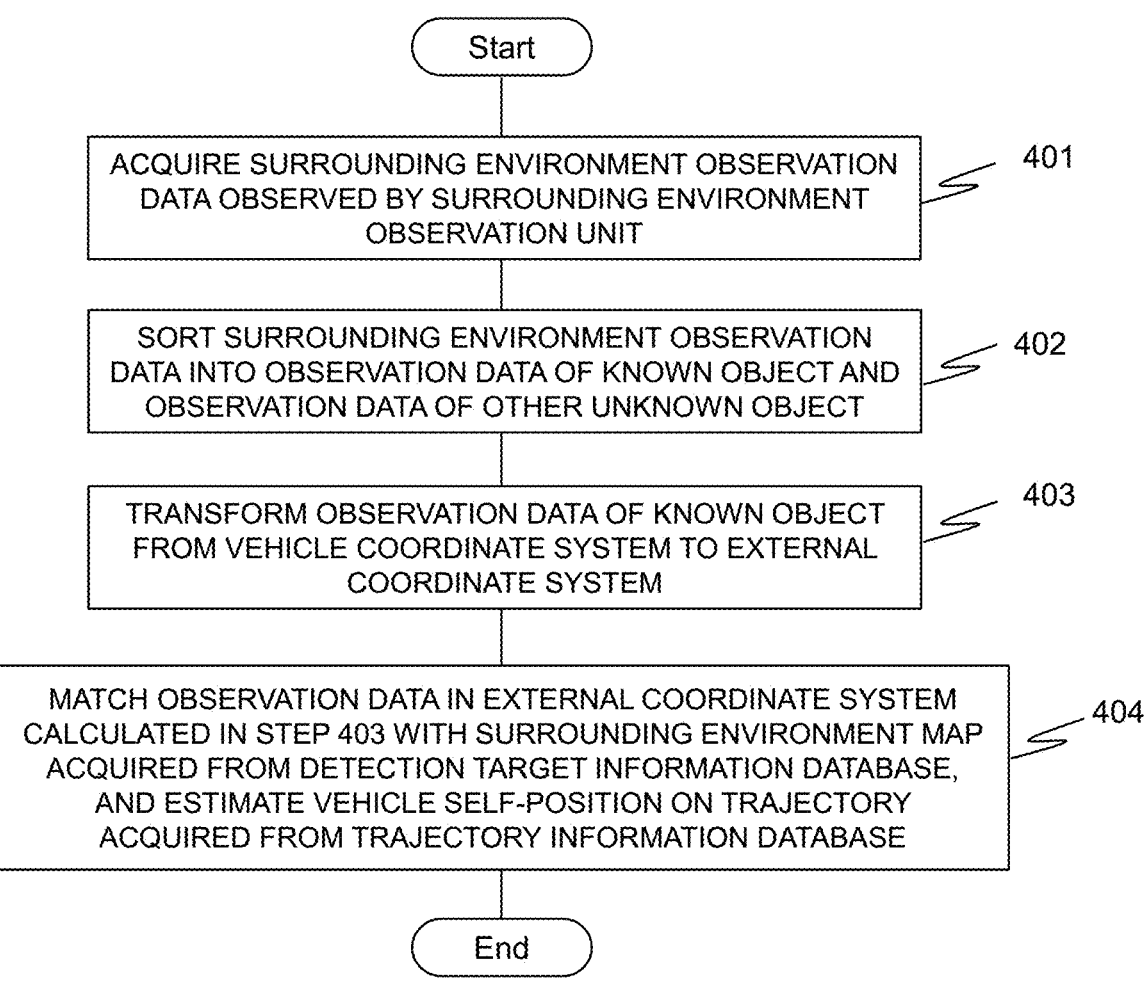

Start

ACQUIRE SURROUNDING ENVIRONMENT OBSERVATION DATA OBSERVED BY SURROUNDING ENVIRONMENT OBSERVATION UNIT — 401

SORT SURROUNDING ENVIRONMENT OBSERVATION DATA INTO OBSERVATION DATA OF KNOWN OBJECT AND OBSERVATION DATA OF OTHER UNKNOWN OBJECT — 402

TRANSFORM OBSERVATION DATA OF KNOWN OBJECT FROM VEHICLE COORDINATE SYSTEM TO EXTERNAL COORDINATE SYSTEM — 403

MATCH OBSERVATION DATA IN EXTERNAL COORDINATE SYSTEM CALCULATED IN STEP 403 WITH SURROUNDING ENVIRONMENT MAP ACQUIRED FROM DETECTION TARGET INFORMATION DATABASE, AND ESTIMATE VEHICLE SELF-POSITION ON TRAJECTORY ACQUIRED FROM TRAJECTORY INFORMATION DATABASE — 404

End

FIG. 21
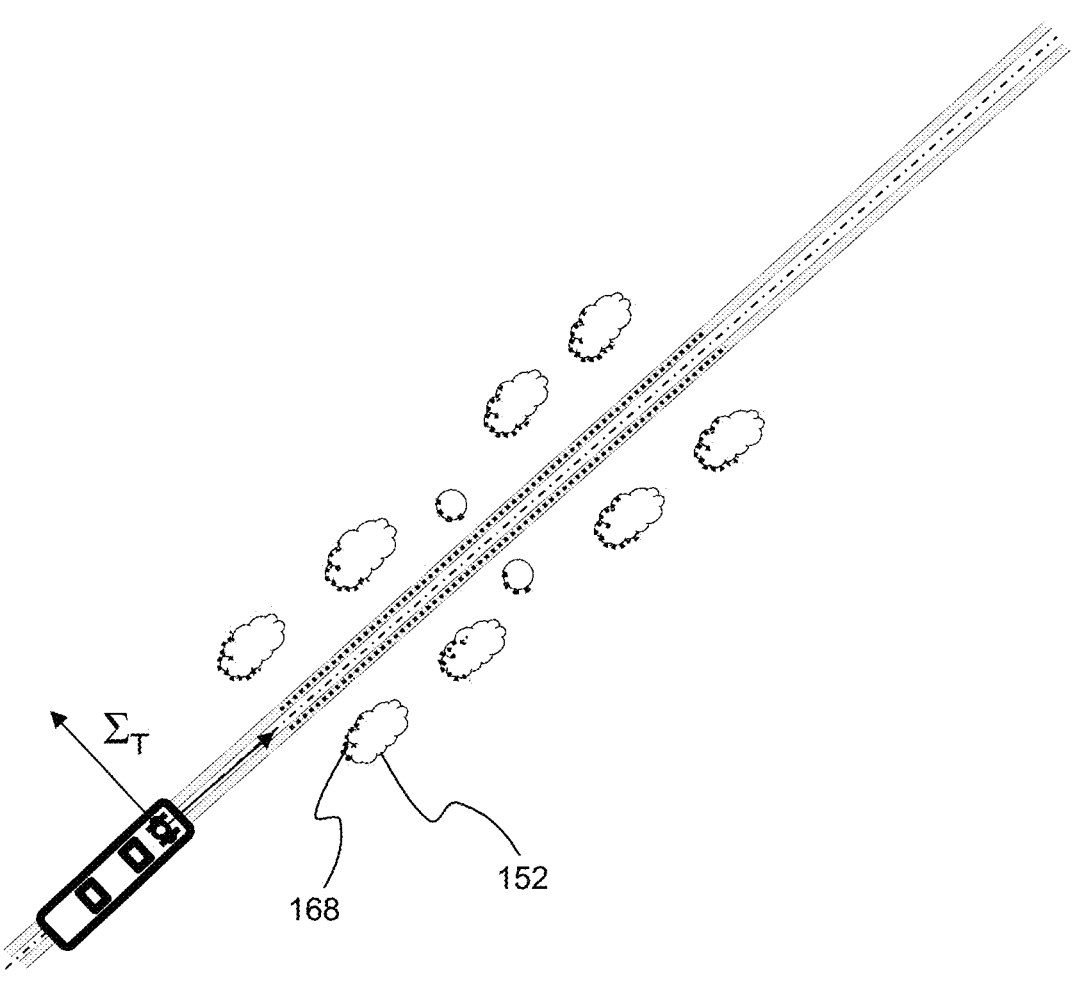
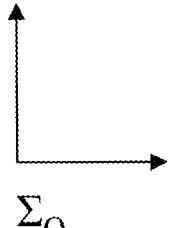

$$c : (c-a) = c' : (c'-a')$$

$$c = L_s \cdot \tan(\theta - \Delta\theta_L/2)$$

$$(c\text{-}a) = L_s \cdot \tan(\theta - \Delta\theta_L/2 - \Delta\theta_g)$$

$$(c'-a') = L_s - L = L_s - V \cdot m \cdot \Delta t$$

$$a' = V \cdot m \cdot \Delta t \qquad (c' - a')$$

$$c' = L_s$$

OBSTACLE DETECTION SYSTEM, OBSTACLE DETECTION METHOD, AND SELF-LOCATION ESTIMATION SYSTEM

TECHNICAL FIELD

The present invention relates to an obstacle detection system and an obstacle detection method for detecting an obstacle while traveling on a trajectory, and a self-position estimation system that estimates a self-position while traveling on a trajectory.

BACKGROUND ART

In a trajectory transport system that travels on a trajectory, when there is an obstacle on or near the trajectory or an obstacle that may cross the trajectory, it is not possible to avoid the obstacle by steering. Therefore, it is important to detect the obstacle in order to improve the safety and operability of a train. Conventionally, an operator operates a train by visually checking that there is no obstacle on a trajectory and on a route. However, it is difficult to constantly monitor all obstacles on the traveling road surface including the vicinity, and there is a concern that the finding of the obstacle is delayed and the trajectory transport system collides with the obstacle.

In an obstacle detection technique in a railway, there is known an obstacle detection system that automatically stops an inspection vehicle that travels before a business vehicle starts traveling when there is an obstacle within a construction limit (in order to secure the safety of a train operation, a prescribed range in which buildings or the like that may be obstacles must not be installed) when whether or not a rail has an abnormality is checked by automatic traveling. For example, in an obstacle detection system disclosed in PTL 1, a technique of detecting an obstacle from a short distance image capturing unit that is provided in a vehicle and captures an image at a short distance while causing the vehicle to be self-propelled, a long distance image capturing unit that captures an image at a long distance, and a LIDAR that further irradiates the inside of the short distance.

PTL 1 discloses a technique of setting a determination line at a plurality of distances in front of a vehicle and determining an object as an obstacle when the object crosses the determination line.

In addition, research on an obstacle detection system in front of a vehicle is being conducted for automatic driving of an automobile. In the research, a camera, a millimeter wave radar, a LIDAR, and the like are generally used, and detection distances of such sensors are disclosed in various media. For example, a millimeter-wave radar or a camera which is a sensor having a long detection distance can detect a long distance of about 200 m.

CITATION LIST

Patent Literature

PTL 1: JP 2016-88183 A

SUMMARY OF INVENTION

Technical Problem

Since the braking distance of the vehicle in the railway is longer than that of an automobile or the like, a longer detection distance is required, but at this time, a large gap may occur between laser beams of the LIDAR. For example, as illustrated in FIG. 1, when a LIDAR having an angular resolution of 0.125 deg and a laser beam spot diameter of 0.08 deg is installed in the front portion of a vehicle to detect an obstacle, there is a gap of about 60 cm at a forward distance of 200 m as illustrated in FIG. 2. Therefore, when a detection target object such as a pedestrian enters into the gap, there is a probability that the detection target object is not detected as an obstacle (FIG. 3). Since there is a gap between the adjacent laser beams of the LIDAR as described above, for example, in a case where two pedestrians cross a far point in front of the train side by side as an obstacle, detection (a circle in the figure) and non-detection (a cross in the figure) are alternately repeated as illustrated in FIG. 4(A). As a result, when the detection point groups by the LIDAR are grouped, they are detected as the same obstacle (pedestrian), and there is a probability that the position includes a large error.

On the other hand, even in a case where there is one pedestrian, tracking of the obstacle may become unstable depending on the behavior of the pedestrian (FIG. 4(B)).

In the technique of PTL 1, a case where there is a gap between laser beams of such a LIDAR has not been researched, and it is difficult to completely detect an obstacle on a trajectory.

The present invention has been made in view of such points, and an object of the present invention is to provide an obstacle detection system and an obstacle detection method for a trajectory traveling vehicle, which are capable of detecting a front obstacle on a trajectory and around the trajectory with high accuracy.

Solution to Problem

In order to solve the above problem, one of representative obstacle detection systems according to the present invention is an obstacle detection system including: a monitoring area setting processing unit that sets an obstacle monitoring area for detecting an obstacle; a front obstacle monitoring unit that monitors an obstacle within the obstacle monitoring area by using a sensor that horizontally scans the front of a train; and an obstacle detection unit that detects an obstacle within the obstacle monitoring area based on a monitoring result of the front obstacle monitoring unit, in which the front obstacle monitoring unit complements a gap in a detection region of the sensor at a first position with the detection region of the sensor while the train moves from the first position to a second position.

Advantageous Effects of Invention

According to the present invention, it is possible to provide an obstacle detection system and an obstacle detection method for a trajectory traveling vehicle, which are capable of detecting a front obstacle on a trajectory and around the trajectory with high accuracy.

Objects, configurations, and advantageous effects other than those described above will be clarified by the descriptions of the following embodiments.

BRIEF DESCRIPTION OF DRAWINGS

FIG. 4 is an explanatory diagram of an influence of the non-detection of the obstacle when there is the gap in the detection region of the obstacle sensor.

FIG. 16 is an explanatory diagram of transformation of a grouping result into a vehicle coordinate system in the obstacle detection system in the embodiment.

FIG. 17 is a diagram illustrating an example of a processing flow of a self-position estimation system in the embodiment.

FIG. 21 is a diagram illustrating an example (after matching) of the matching between the surrounding environment observation data and the surrounding environment map data in the self-position estimation system in the embodiment.

DESCRIPTION OF EMBODIMENTS

Hereinafter, embodiments of an obstacle detection system and an obstacle detection method capable of detecting a front obstacle on a trajectory and around the trajectory with high accuracy, and a self-position estimation system capable of estimating a self-position with high accuracy will be described.

In the conventional obstacle detection system, the detectable distance of the camera, the millimeter wave radar, or the LIDAR constituting the system depends on the color or shape of the detection target object and the reflectance of the millimeter wave or the laser, so that it is difficult to stably detect the obstacle.

In the obstacle detection system and the obstacle detection method according to the embodiments described below, it is possible to detect an obstacle without depending on the color, the shape, or the reflectance of a detection target object.

Hereinafter, embodiments will be described with reference to the drawings.

EMBODIMENTS

Figure 1:
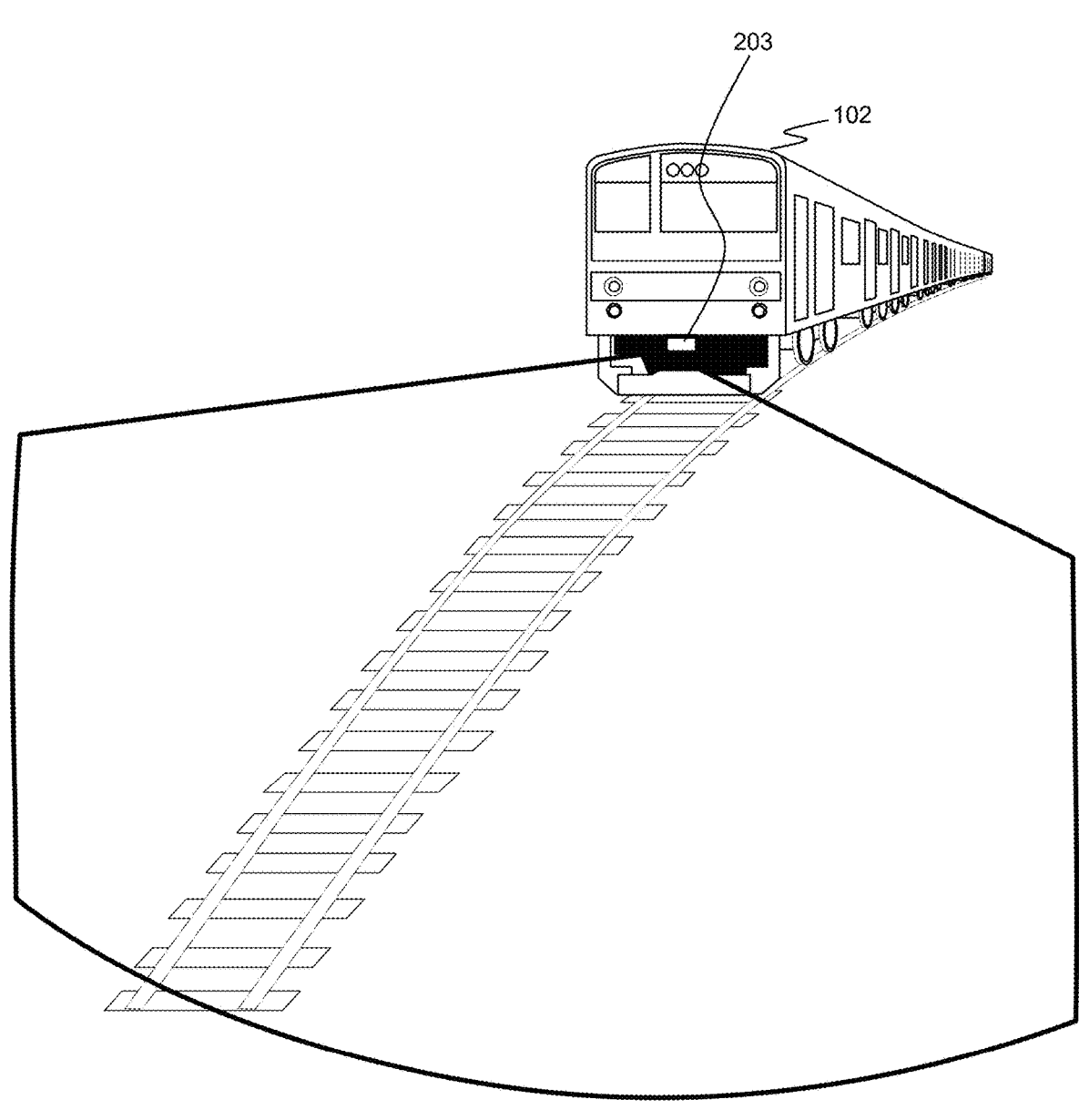
FIG. 1 is a diagram illustrating an example of installation of an obstacle sensor in an obstacle detection system and a trajectory transport system according to an embodiment.
Figure 2:
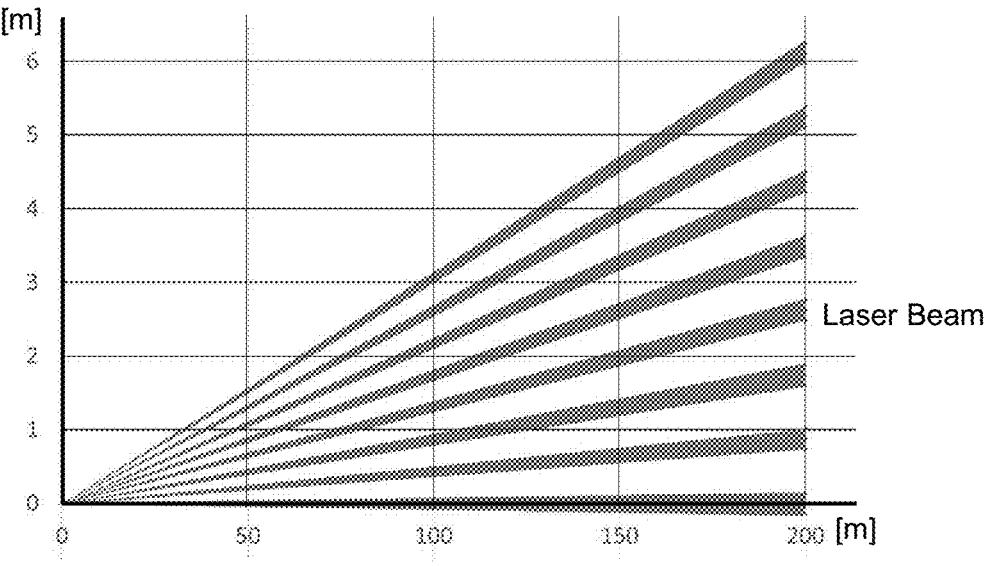
FIG. 2 is a diagram illustrating an example of a gap in a detection region of an obstacle sensor.
Figure 3:
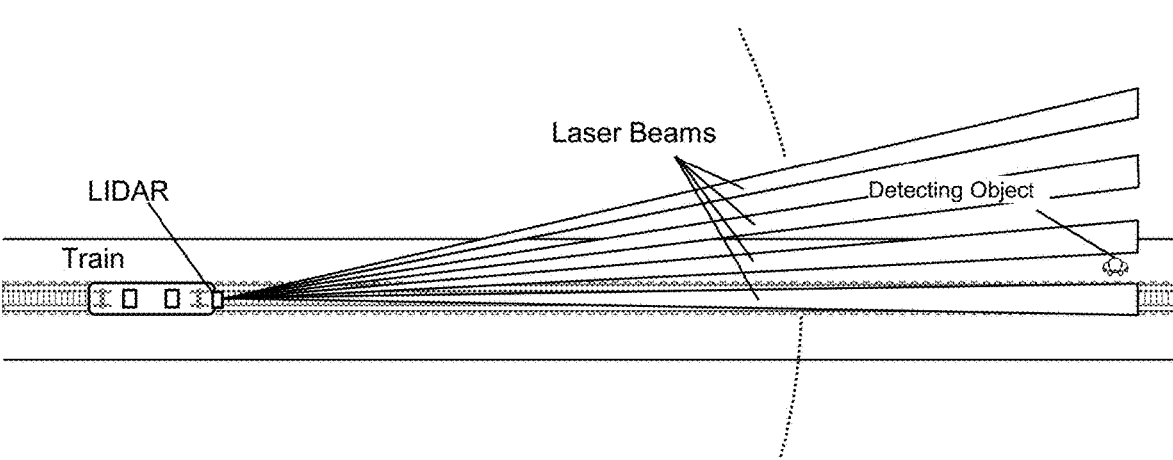
FIG. 3 is a diagram illustrating an example of non-detection of an obstacle when there is a gap in the detection region of the obstacle sensor.
Figure 5:
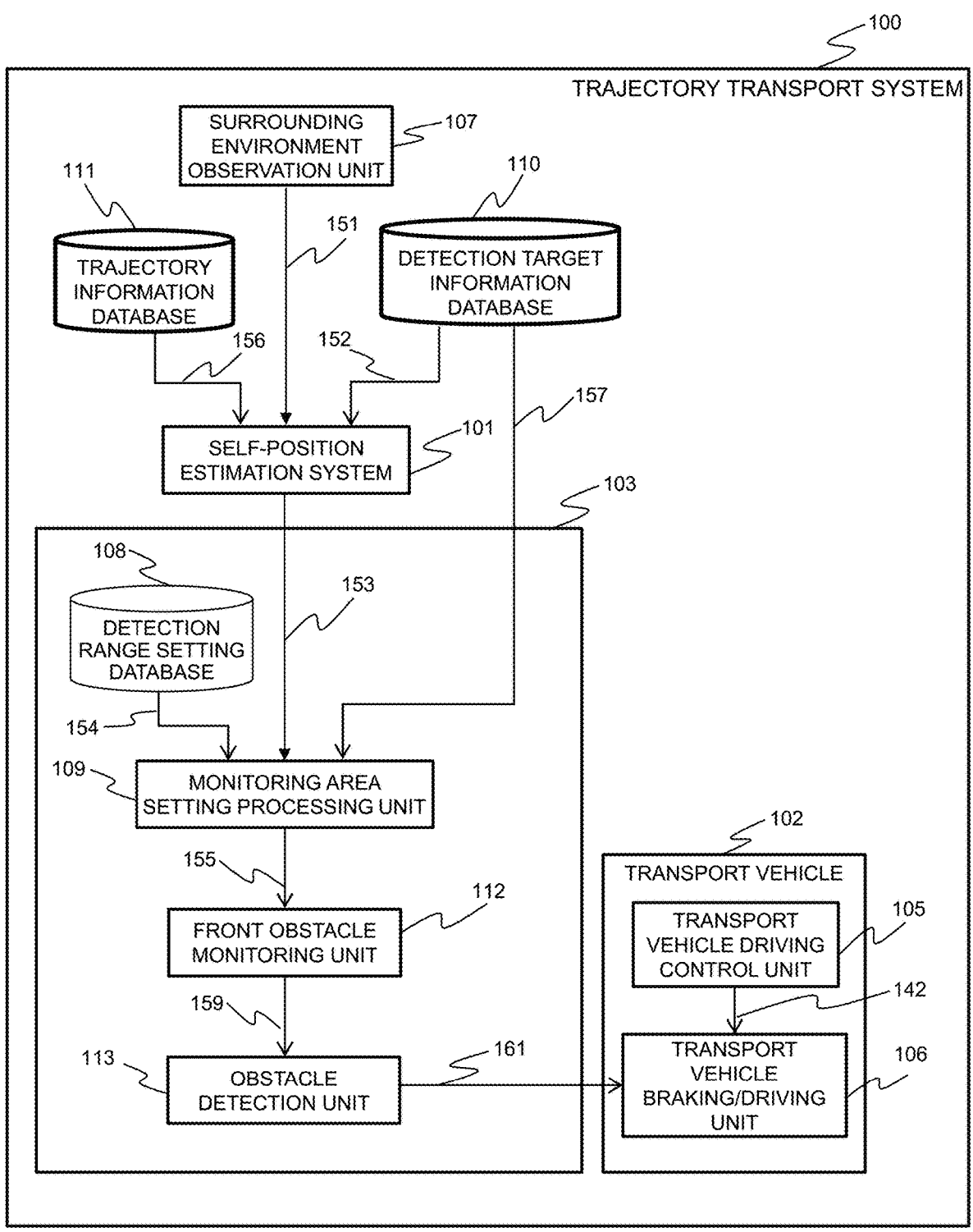
FIG. 5 is a diagram illustrating an example of a system configuration of the trajectory transport system in the embodiment.

In the present embodiment, a trajectory transport system 100 that includes a transport vehicle 102, a self-position estimation system 101, a surrounding environment observation unit 107, and an obstacle detection system 103 as illustrated in FIG. 5, and greatly improves reliability of obstacle detection of an obstacle detection system will be described.

First, a configuration of the trajectory transport system 100 and the function of each component will be described with reference to FIG. 5.

The transport vehicle 102 is a vehicle that travels along a trajectory and transports passengers and freight.

The surrounding environment observation unit 107 is a device that is installed in front of the transport vehicle 102 and acquires the position, the shape, the color, the reflectance, and the like of an object around the transport vehicle 102. The surrounding environment observation unit 107 includes a camera, a laser radar, or a millimeter wave radar.

The obstacle detection system 103 is a system that detects an obstacle based on position/speed information 153 of the transport vehicle 102 acquired from the self-position estimation system 101.

When the obstacle detection system 103 detects an obstacle that hinders traveling of the transport vehicle 102, information on the existence of the obstacle is transmitted from the obstacle detection system 103 to the transport vehicle 102, and the transport vehicle 102 is brought to an emergency stop. The transport vehicle 102 includes a transport vehicle driving control unit 105 and a transport vehicle braking/driving unit 106.

The obstacle detection system 103 includes a detection range setting database 108, a monitoring area setting processing unit 109, a front obstacle monitoring unit 112, and an obstacle detection unit 113.

The transport vehicle driving control unit 105 is means for generating a braking/driving command of the transport vehicle 102. An ATO device (automatic train operation device) is exemplified. A generated transport vehicle braking/driving command 142 is transmitted to the transport vehicle braking/driving unit 106.

The transport vehicle driving control unit 105 generates a braking/driving command so that the transport vehicle 102 travels along a target travel pattern defined by the position and the speed. Although not illustrated in FIG. 5, in order to travel along the target travel pattern, a function of detecting the position and the speed of the transport vehicle 102 is provided therein.

The target travel pattern is generated based on a pattern based on the acceleration/deceleration of the transport vehicle 102 and the speed limit of a traveling section known in advance. In addition, the allowable maximum speed of the transport vehicle 102 is calculated from the position of the transport vehicle 102 and the maximum deceleration of the transport vehicle 102, and the calculated allowable maximum speed is reflected in the target travel pattern of the transport vehicle 102.

The transport vehicle braking/driving unit 106 brakes and drives the transport vehicle 102 based on the transport vehicle braking/driving command 142 acquired from the transport vehicle driving control unit 105. Specific examples of the transportation vehicle braking/driving unit 106 include an inverter, a motor, and a friction brake.

The obstacle detection information 161 is input from the obstacle detection unit 113 to the transport vehicle braking/driving unit 106. When the transport vehicle 102 is stopped at a station and the content of the obstacle detection information 161 is "obstacle: existence", regardless of the transport vehicle braking/driving command 142, the transport vehicle 102 is turned into a braking state so that the vehicle cannot start. When the transport vehicle 102 travels between stations and the content of the obstacle detection information 161 is "obstacle: existence", regardless of the transport vehicle braking/driving command 142, braking is performed at the maximum deceleration to stop the transport vehicle 102.

The monitoring area setting processing unit 109 acquires a detection range 154 corresponding to a current position/speed 153 of the transport vehicle, which is estimated by the self-position estimation system 101 from the detection range setting database 108, and sets an obstacle monitoring area for detecting an obstacle. Among pieces of the detection target data 157, detection target data in which the position of a detection target is within the obstacle monitoring area is transferred to the front obstacle monitoring unit 112, as detection target data 155 within the obstacle monitoring area.

It is conceivable that the detection range setting database 108 is, for example, based on the registration of the construction limit, and an area near the home, an area in which maintenance work is performed, and the like are registered as an area in which no detection is performed.

The front obstacle monitoring unit 112 has a function of detecting an obstacle in the obstacle monitoring area by using a camera, a laser radar, or the like. Here, the front obstacle monitoring unit 112 may share a sensor with the surrounding environment observation unit 107.

The obstacle detection unit 113 detects an obstacle in the obstacle monitoring area based on the monitoring result 159 of the front obstacle monitoring unit 112.

When detecting an obstacle that hinders the operation of the transport vehicle 102, the obstacle detection unit 113 transmits information of "obstacle: existence" to the transport vehicle braking/driving unit 106.

The configuration and each component of the trajectory transport system 100 have been described above.

Figure 6:
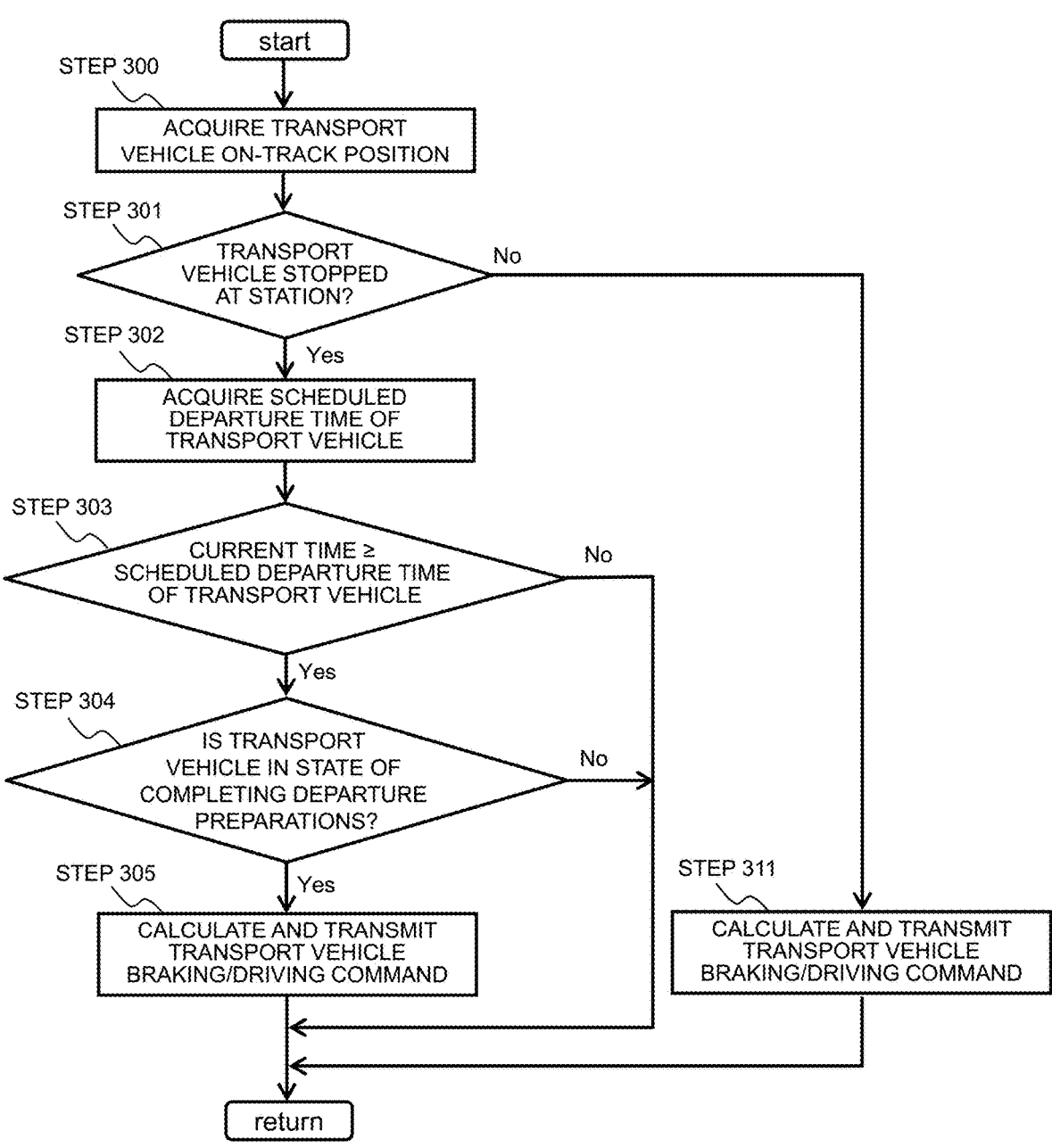
FIG. 6 is a diagram illustrating an example of a processing flow of a transport vehicle driving control unit in the obstacle detection system and the trajectory transport system in the embodiment.

Next, a flow of processing of the transport vehicle driving control unit 105 will be described with reference to FIG. 6. In the transport vehicle driving control unit 105, the processing illustrated in FIG. 6 is performed at a regular cycle.

In Step 300, a transport vehicle on-track position is acquired.

In Step 301, it is determined whether or not the transport vehicle 102 is stopped at a station. The determination is made from the position and the speed of the transport vehicle 102, which are stored by the transport vehicle driving control unit 105. Specifically, when the position is near the station and the speed is zero, it is determined that the vehicle is stopped at the station.

When it is determined in Step 301 that the transport vehicle 102 is being stopped, in Step 302, the scheduled time at which the transport vehicle departs from the currently stopped station is acquired from an operation management system (not illustrated in FIG. 5).

In Step 303, it is determined whether or not the current time has passed the scheduled departure time acquired in Step 302. When the current time has not passed the scheduled departure time, the processing flow is ended. When the current time has passed the scheduled departure time, the process proceeds to Step 304.

In Step 304, it is determined whether or not the transport vehicle 102 has completed departure preparations. As an example of the departure preparation, check of a vehicle door closed state can be exemplified. When the transport vehicle 102 has not completed departure preparations yet, the processing flow is ended. When the departure preparation has completed, the process proceeds to Step 305.

In Step 305, a transport vehicle braking/driving command 142 is calculated and transmitted to the transport vehicle braking/driving unit 106. Specifically, here, a powering command is transmitted in order to depart from the station.

Next, a process (Step 311) when the transport vehicle 102 is not stopped at the station in Step 301 will be described.

In Step 311, the transport vehicle braking/driving command 142 is calculated and transmitted to the transport vehicle braking/driving unit 106. Specifically, here, first, the target speed is calculated based on the position of the transport vehicle 102 and a target travel pattern defined in advance. The braking/driving command is calculated by proportional control or the like so that the speed of the transport vehicle 102 becomes the target speed.

The example of the control flow of the transport vehicle driving control unit 105 has been described above.

Figure 7:
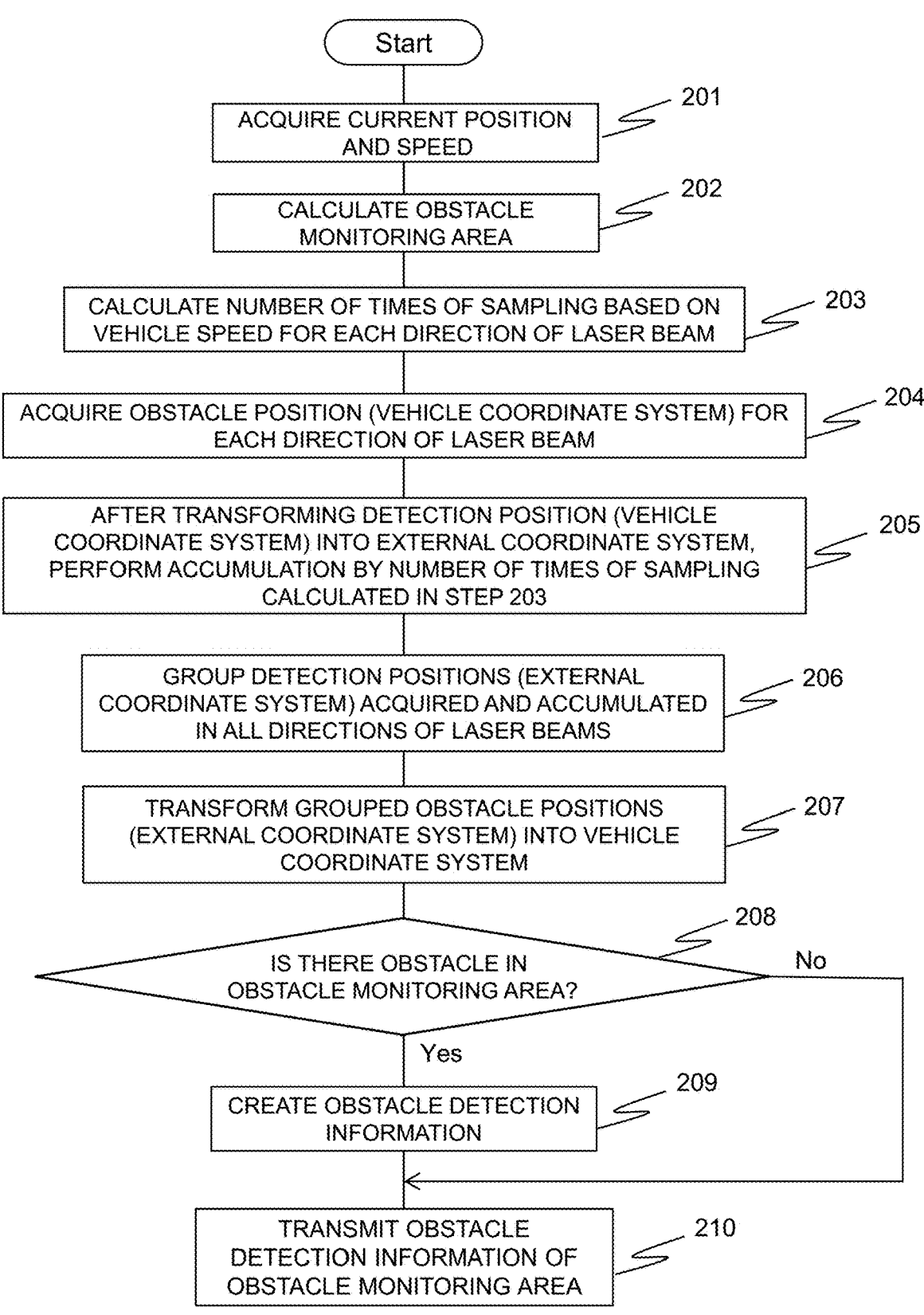
FIG. 7 is a diagram illustrating an example of a processing flow of the obstacle detection system in the embodiment.

Next, the operation of the obstacle detection system 103 will be described. FIG. 7 is a flowchart illustrating a processing procedure performed by the obstacle detection system 103.

In Steps 201 to 210, a stop instruction for the transport vehicle is created. This processing is performed for each measurement cycle of the obstacle detection system 103.

In Step 201, the current position and speed of the transport vehicle 102 necessary for calculating the obstacle detection range are acquired from the self-position estimation system 101.

In Step 202, an obstacle monitoring area is set from a detection range corresponding to the current position of the transport vehicle, which has been acquired in Step 201.

For example, it is conceivable to set a construction limit as a side boundary of the obstacle monitoring area and set a stoppable distance of the transport vehicle as a traveling direction boundary of the obstacle monitoring area.

Figure 8:
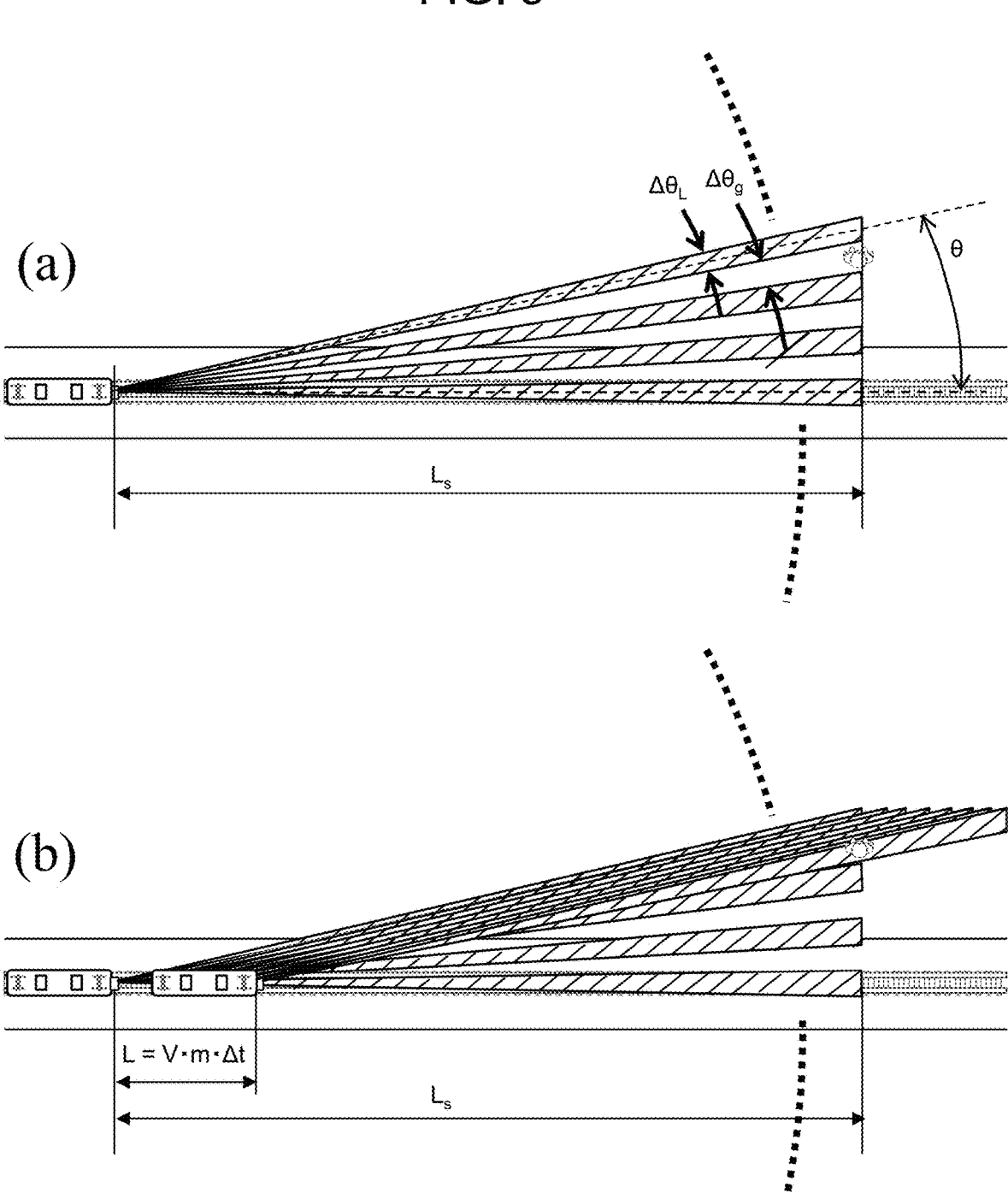
FIG. 8 is a diagram illustrating an example of processing of complementing a gap in a detection region of the obstacle sensor.

In Step 203, the number m of times of sampling is calculated for each direction $\theta$ of a laser beam (spot diameter $\Delta\theta_L$) emitted from the LIDAR installed in the vehicle at a speed V (FIG. 8). The number m of times of sampling for complementing a gap $\Delta\theta_g$ between laser beams at a distance $L_s$ is obtained by Expression 1 (sampling period $\Delta t$).

$$m = L_s(1-\tan(\theta-\Delta\theta_L/2-\Delta\theta_g)/\tan(\theta-\Delta\theta_L/2))/(V\cdot\Delta t) \qquad \text{Expression 1}$$

A method of obtaining Expression 1 will be described.

As illustrated in FIG. 8($a$), attention is paid to a laser beam having a width $\Delta\theta_L$, which is emitted in a $\theta$ direction from a LIDAR installed in front of a train. As illustrated in FIG. 8($b$), the train is repeatedly measured by the LIDAR while moving forward until the right end of the beam in the $\theta$ direction comes into contact with the left end of the adjacent beam, so that an obstacle between gaps $\Delta\theta_g$ can be detected.

At this time, assuming that the speed of the train is V, the number of times of measurement is m, and the measurement cycle is $\Delta t$, a movement distance L of the train can be calculated by $L=V\cdot m\cdot\Delta t$.

Figure 24:
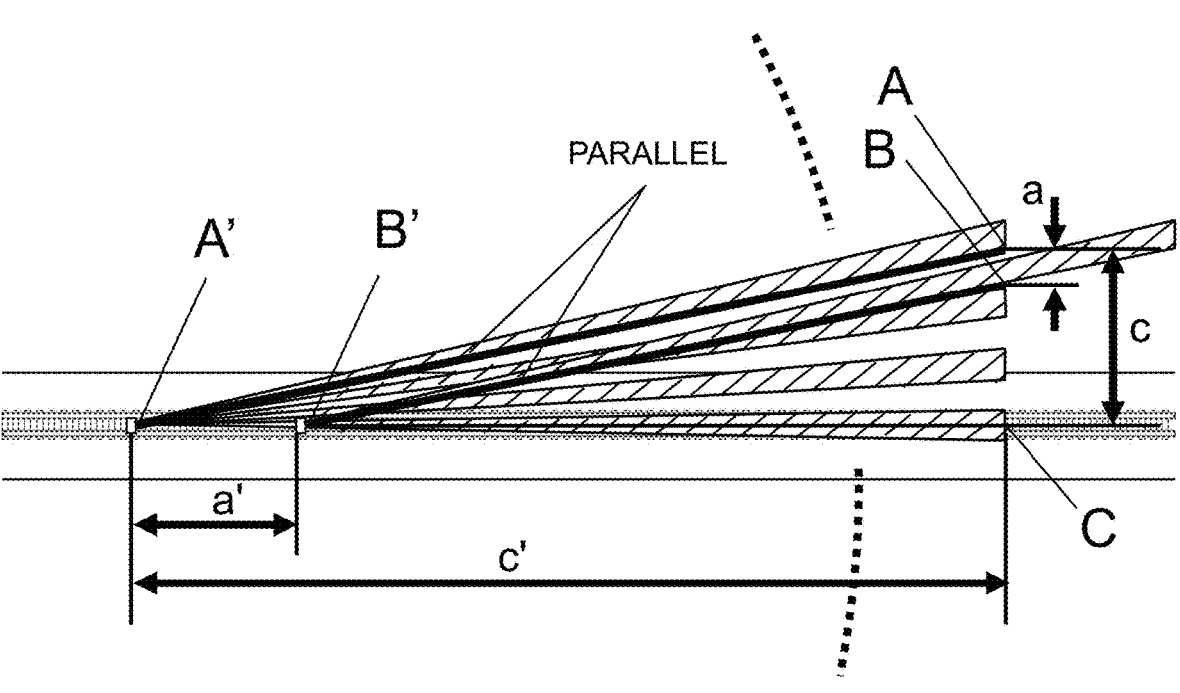
FIG. 24 is an explanatory diagram of a method of obtaining Expression 1.
Figure 25:
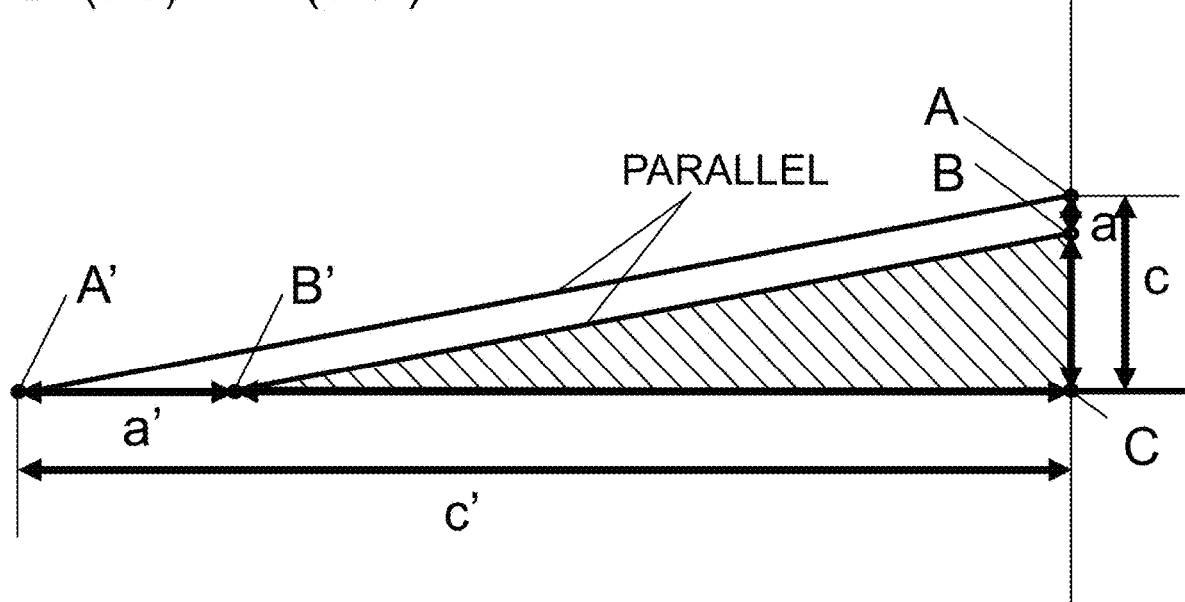
FIG. 25 is an explanatory diagram of the method of obtaining Expression 1.

As illustrated in FIG. 24, a sensor position before the movement is set as A', a sensor position after the movement is set as B', the right end of the beam in the $\theta$ direction at the distance $L_s$ is set as A, and the left end of the adjacent beam is set as B. When distances AB, AC, A'B', and A'C between two points are set as a, c, a', and c', respectively, triangles ACA' and BCB' are similar triangles, and thus Expression 2 is established (FIG. 25).

$$c: (c-a)=c': (c'-a') \qquad \text{Expression 2}$$

Figure 26:
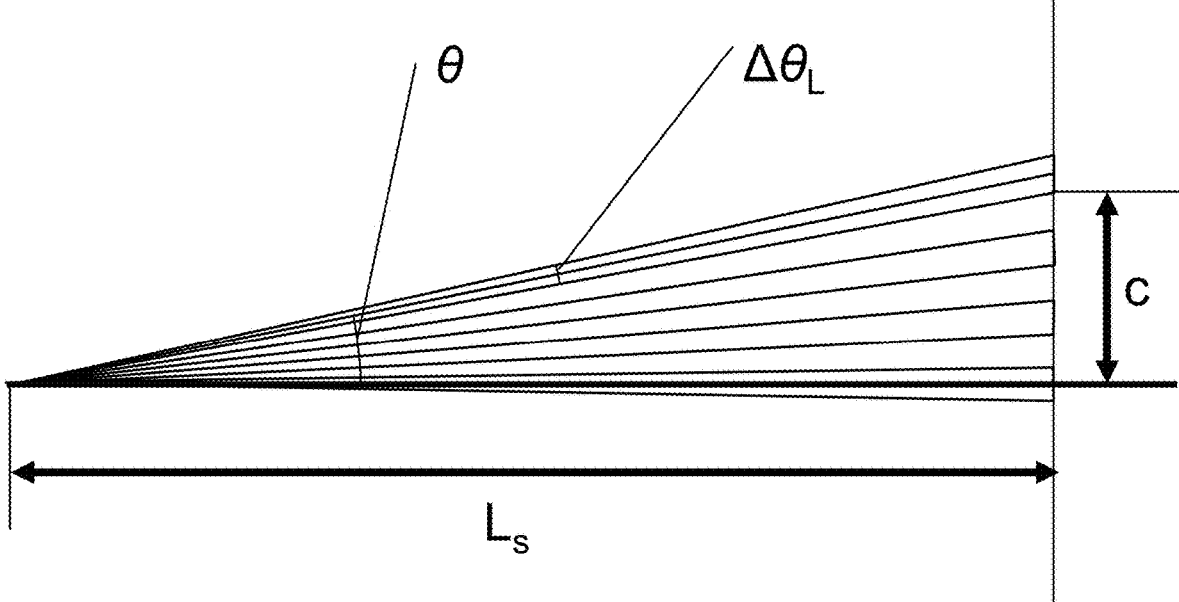
FIG. 26 is an explanatory diagram of the method of obtaining Expression 1.
Figure 27:
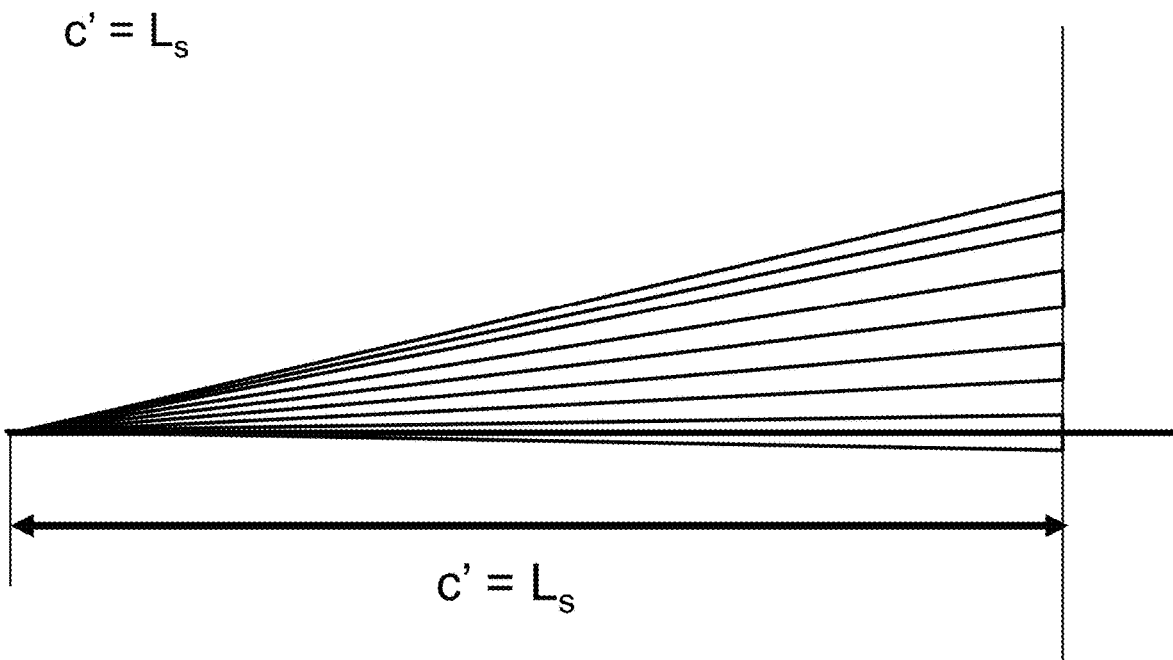
FIG. 27 is an explanatory diagram of the method of obtaining Expression 1.
Figure 28:
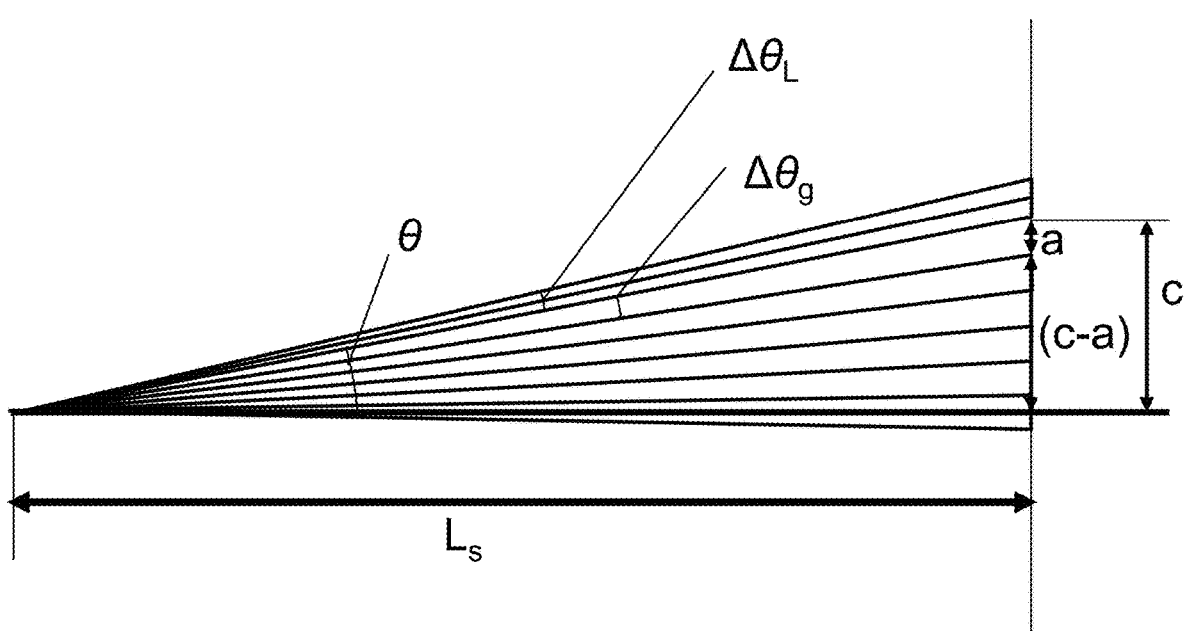
FIG. 28 is an explanatory diagram of the method of obtaining Expression 1.

Here, from FIGS. 26 and 27, $c=L_s\cdot\tan(\theta-\Delta\theta_L/2)$ and $c'=L_s$, and, as is clear from FIG. 28, Expression 3 is established.

$$(c-a)=L_s\cdot\tan(\theta-\Delta\theta_L/2-\Delta\theta_g) \qquad \text{Expression 3}$$

Figure 29:
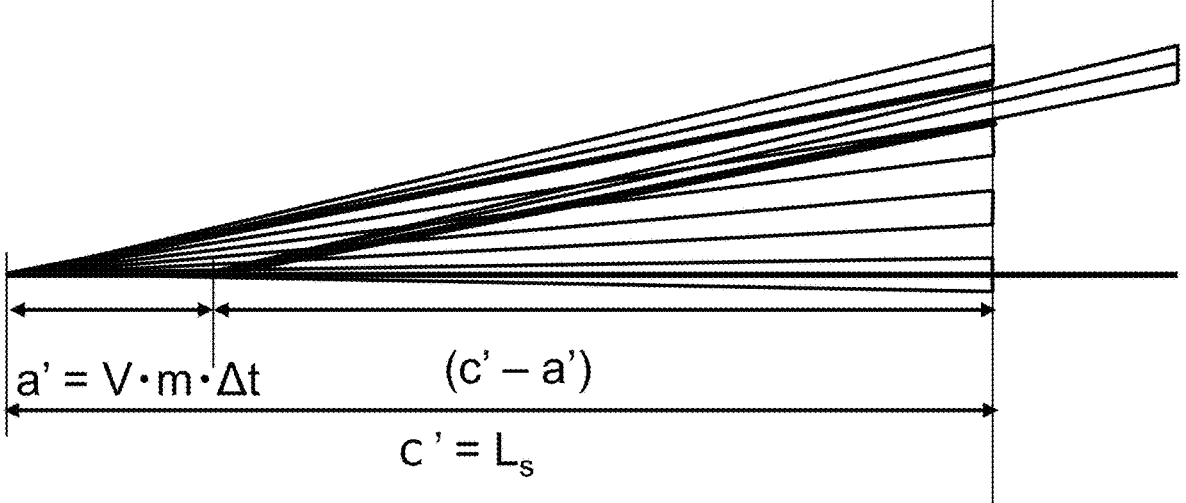
FIG. 29 is an explanatory diagram of the method of obtaining Expression 1.

In addition, Equation 4 is obtained from FIG. 29.

$$(c'-a')=L_s-V\cdot m\cdot\Delta t \qquad \text{Expression 4}$$

The variables are substituted into Expression 2 and solved for m as follows.

$$L_s\cdot\tan(\theta-\Delta\theta_L/2): L_s\cdot\tan(\theta-\Delta\theta_L/2-\Delta\theta_g)=L_s: (L_s-V\cdot m\cdot\Delta t)$$

$$L_s\cdot\tan(\theta-\Delta\theta_L/2)\cdot(L_s-V\cdot m\cdot\Delta t)=L_s\cdot\tan(\theta-\Delta\theta_L/2-\Delta\theta_g)\cdot L_s$$

$$V\cdot m\cdot\Delta t=L_s(1-\tan(\theta-\Delta\theta_L/2-\Delta\theta_g)/\tan(\theta-\Delta\theta_L/2))$$

$$m=L_s(1-\tan(\theta-\Delta\theta_L/2-\Delta\theta_g)/\tan(\theta-\Delta\theta_L/2))/(V\cdot\Delta t)$$

Thus, Expression 1 has been obtained.

Here, in the calculation of the number of times of sampling based on the vehicle speed, it is important that the gap between the laser beams is smaller than the width of the obstacle by the integration of the LIDAR data, and that the movement distance L at which the vehicle travels while measuring the gap between the laser beams is shorter than a movement distance $V_t\times t_a$ at which the vehicle travels within the required allowable time $t_a$ of obstacle detection.

Figure 9:
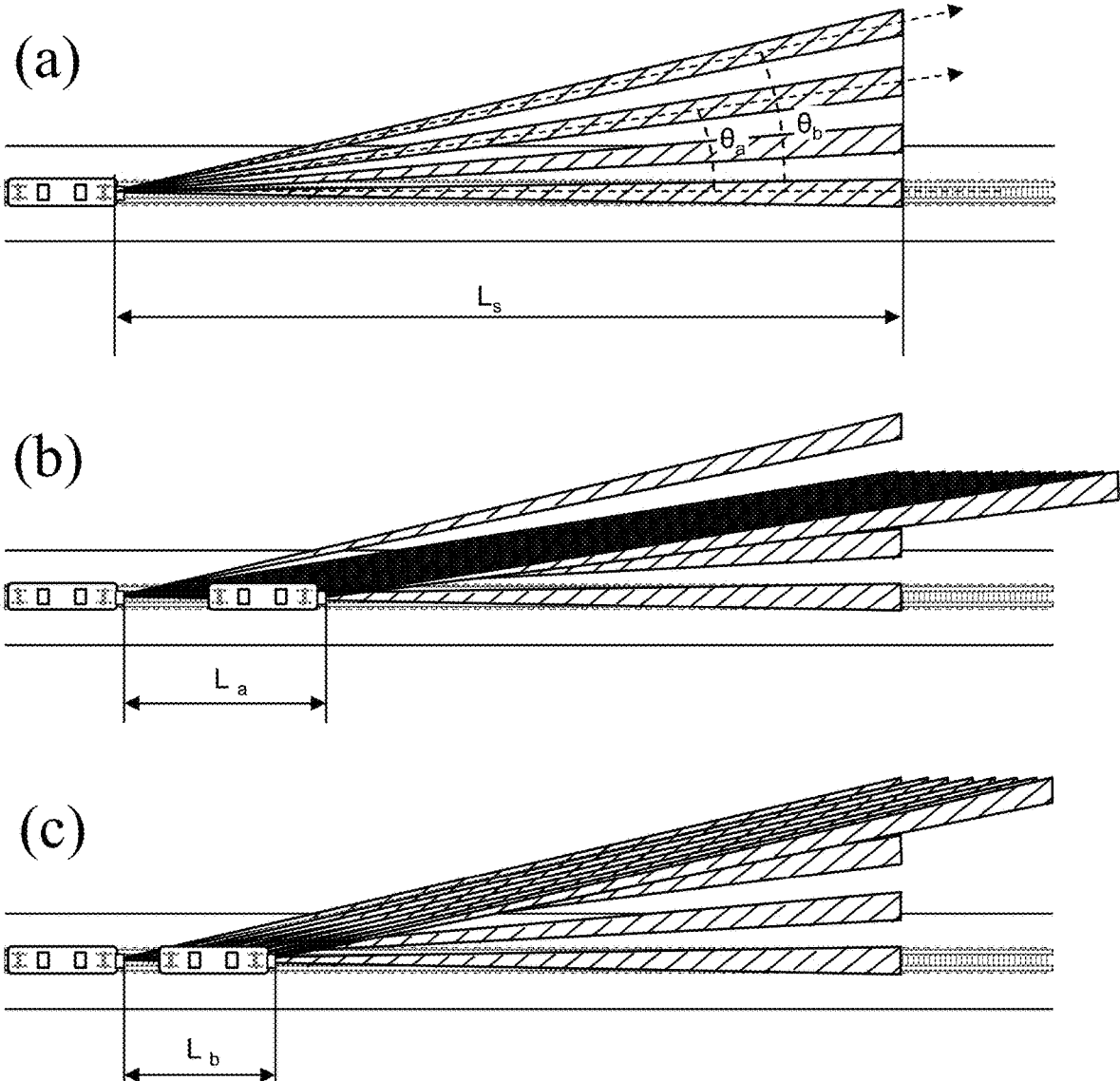
FIG. 9 is an explanatory diagram of a change in a movement distance necessary for complementing a gap in a region due to a difference in a detection direction of the obstacle sensor.

As illustrated in FIG. 9($a$), as the detection direction by the LIDAR becomes far away from the traveling direction from $\theta_a$ to $\theta_b$, the necessary movement distance gradually decreases from $L_a$ to $L_b$ as illustrated in FIGS. 9($b$) and 9($c$). This means that, when measurement is performed by the LIDAR from a train traveling at a predetermined speed, the number of times of measurement in the same gap decreases as the distance from the traveling direction increases.

Figure 10:
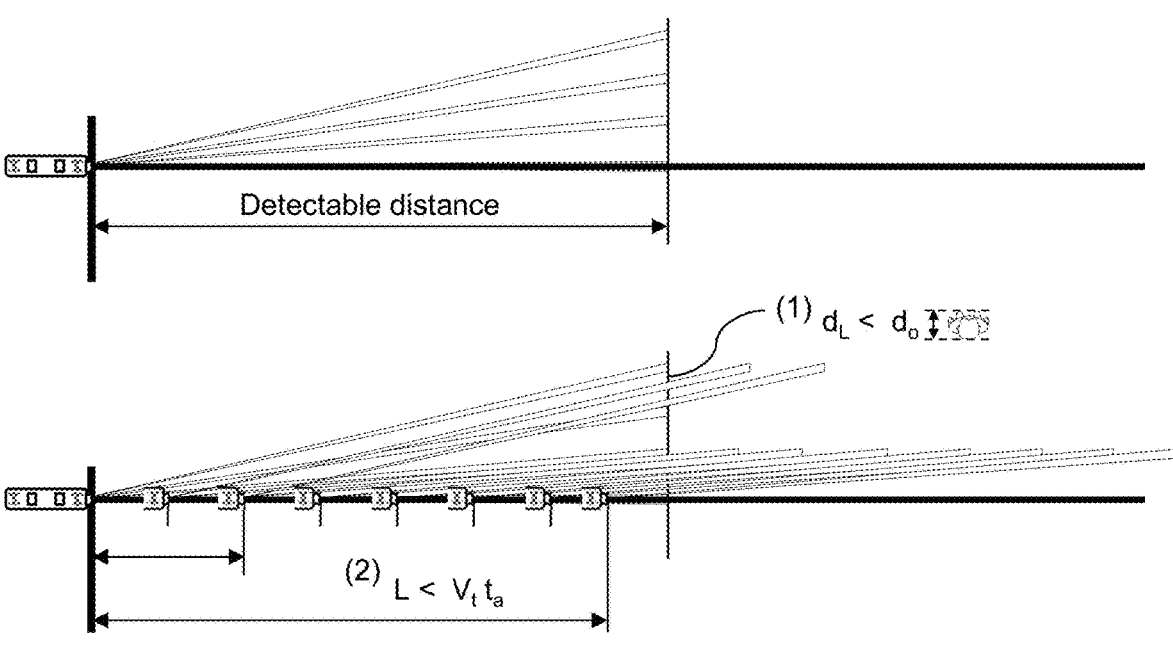
FIG. 10 is an explanatory diagram of conditions necessary for complementing a gap in the detection region of the obstacle sensor with observation results from a plurality of positions during movement.

That is, as illustrated in FIG. 10(1), it is necessary to shorten the sampling period of the LIDAR so as to enable securing of the number of times of measurement in which a distance $d_L$ between the laser beams becomes smaller than a width $d_o$ of the target obstacle.

Figure 11:
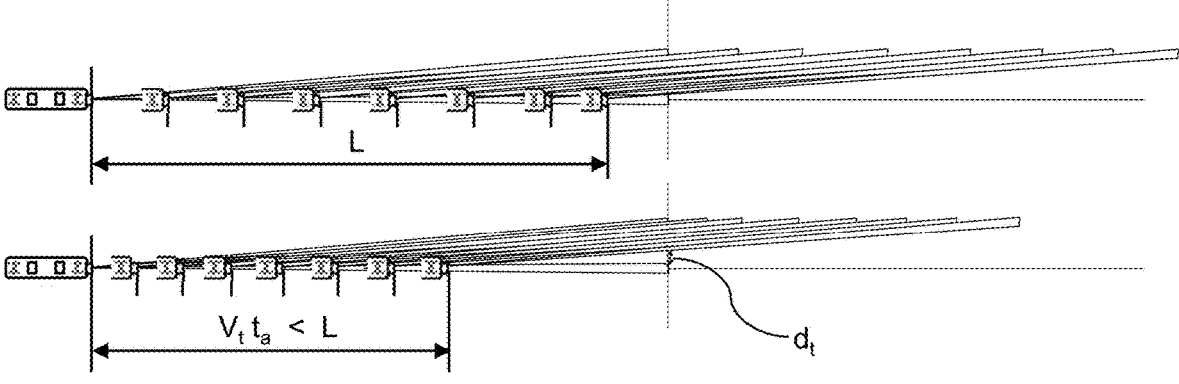
FIG. 11 is an explanatory diagram of conditions necessary for complementing a gap in a direction close to a traveling direction among gaps in the detection region of the obstacle sensor with observation results from a plurality of positions during movement.

On the other hand, as the laser beam irradiation direction of the LIDAR is closer to the traveling direction than in a case where the laser beam irradiation direction is separated in a ties direction, a longer movement distance L of the train (a distance at which complementation of the gaps between the laser beams is completed) is required to detect an obstacle in the gap between the laser beams as illustrated in FIG. 10(2). In order to be able to output the obstacle detection result within the requested allowable time $t_a$, when the speed of the train is set as $V_t$, $L<V_t\times t_a$ must be satisfied. Depending on the magnitudes of $V_t$ and $t_a$, when $V_t\times t_a<L$ is satisfied as illustrated in FIG. 11, a non-detection range (width $d_r$[m]) is generated, and it is not possible to detect an obstacle smaller than the width $d_r$. The allowable time $t_a$ can be, for example, a time required for the train to travel at the speed $V_t$ by subtracting the stop distance at the speed $V_t$ of the train from the detection distance of the LIDAR.

Figure 12:
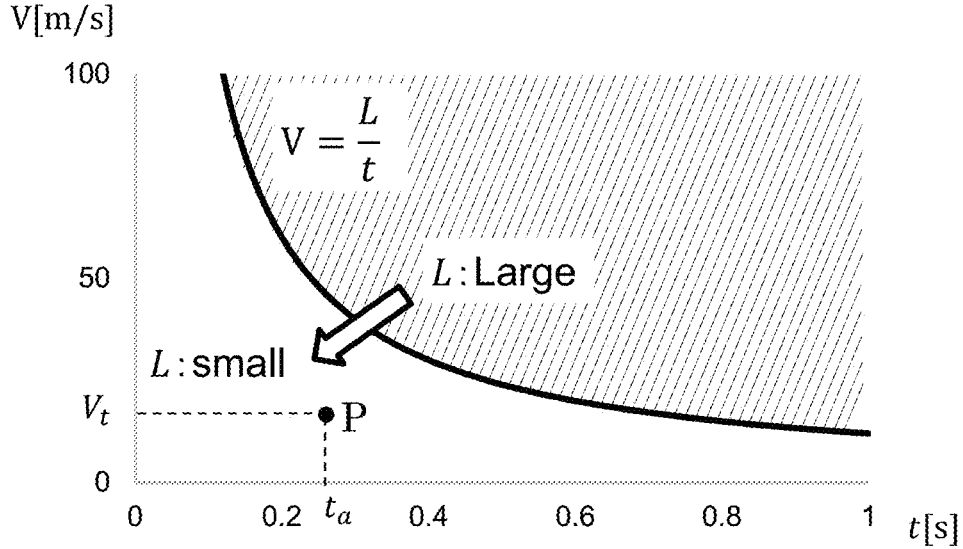
FIG. 12 is a diagram illustrating an example of a relationship between a movement distance L necessary for complementing a gap between laser beams, a train speed $V_t$, and a detection allowable time $t_a$.

FIG. 12 illustrates an example of a relationship between the movement distance L necessary for complementing the gap between the laser beams, the train speed $V_t$, and the detection allowable time $t_a$. The point $P(V_t, t_a)$ needs to be in the upper right region of the curve $V=L/t$ (hatched portion in the drawing).

Figure 13:
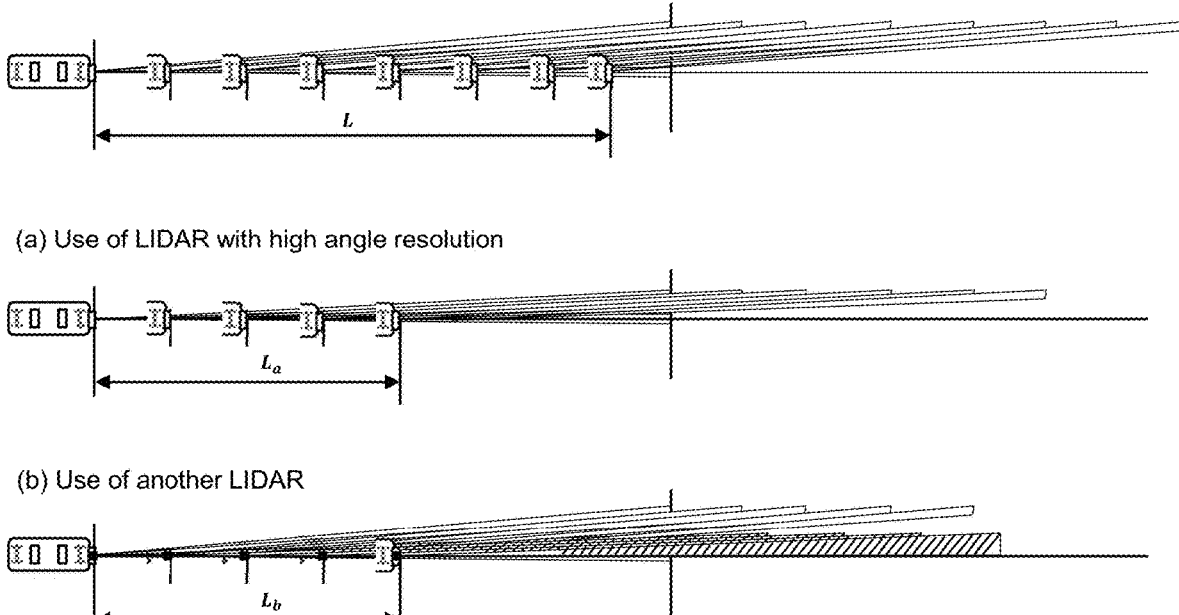
FIG. 13 is a diagram illustrating an example of a system configuration of an obstacle detection system that shortens a movement distance L necessary for complementing the gap between the laser beams.
Figure 14:
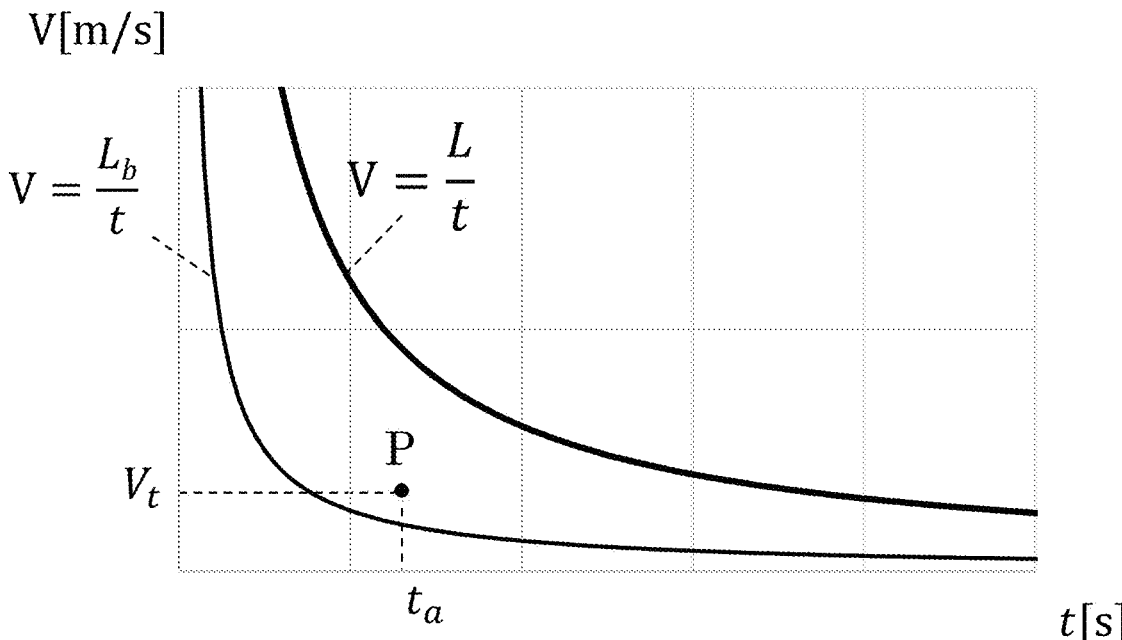
FIG. 14 is a diagram illustrating a relationship among $L_b$, the train speed $V_t$, and the detection allowable time $t_a$ in the system configuration of the obstacle detection system that shortens the movement distance L necessary for complementing the gap between the laser beams.

Here, L can be reduced by using the LIDAR having a small angle pitch and a large laser spot light ($L_a$ in FIG. 13($a$)). However, there is a problem that the sampling period becomes longer by the amount or it is not possible to measure a small obstacle because the laser spot light is large. On the other hand, L can also be reduced by adding a sensor that normally observes only the front direction ($L_b$ in FIG. 13($b$)). As an example, another LIDAR is installed in front of the train such that the laser scan plane is perpendicular to the road surface (such that the major axis of the laser spot light is parallel to the road surface), thereby the occurrence of an obstacle in the non-detection range can be monitored. In FIG. 13, as the movement distance changes from L to $L_b$, the point $P(V_t, t_a)$ is located in the upper right region of the curve $V=L/t$ as illustrated in FIG. 14.

As the train speed $V_t$ increases, the idling distance particularly increases in the train, and the allowable time $t_a$ that can be used for obstacle detection rapidly decreases. As a result, $V_t\times t_a$ tends to decrease as the train speed $V_t$ increases, and a LIDAR obstacle detection system needs to be configured such that L decreases accordingly in consideration of the maximum speed.

In Step 204, an obstacle detection position (vehicle coordinate system) in the obstacle monitoring area calculated in Step 202 is acquired for each direction of the laser beam emitted from the LIDAR.

When the detection result in the monitoring area satisfies any one of (Condition 1) to (Condition 3) below compared with the detection target data registered in the detection target information database, it is determined that an obstacle has occurred.

(Condition 1) The known detection point registered in the database is not detected. (Condition 2) The reflectance of the known detection point is different. (Condition 3) A detection point is detected at a position different from the known detection point.

(Condition 3) is used in general obstacle detection in the automobile field and the like. On the other hand, since the vehicle travels on the known trajectory in the railway field, it is possible to detect an obstacle by (Condition 1) and (Condition 2). For example, it is also possible to detect an obstacle near a known object or in a gap between a plurality of objects.

Here, as the speed of the transport vehicle increases, the stop distance of the transport vehicle increases, and the obstacle monitoring area expands. When the reflectance of the known detection point located at a long distance is small, it may be erroneously determined that an obstacle has occurred due to (Condition 1). Therefore, for example, it is necessary to suppress an allowed travelable speed.

Therefore, in order to avoid suppression of the allowed travelable speed, the following measures of (Measure 1) and (Measure 2) will be considered.

(Measure 1) Only the position of an existing object (rail, sign, or the like) having a detection rate of a certain value or more in the detection region is set as a detection target. (Measure 2) An object having a detection rate of a certain value or more is installed in the detection region as a detection target. For example, it is conceivable that an object having a reflectance of a certain value or more has a detection rate of a certain value or more.

In any case, the position and the reflectance of the detection target are recorded in advance in the detection target information database 110 as the detection target data 157. In addition, only when the position of the detection target is included in the obstacle monitoring area at the current position of the transportation vehicle, the detection target is used to determine the occurrence of the obstacle.

Figure 15:
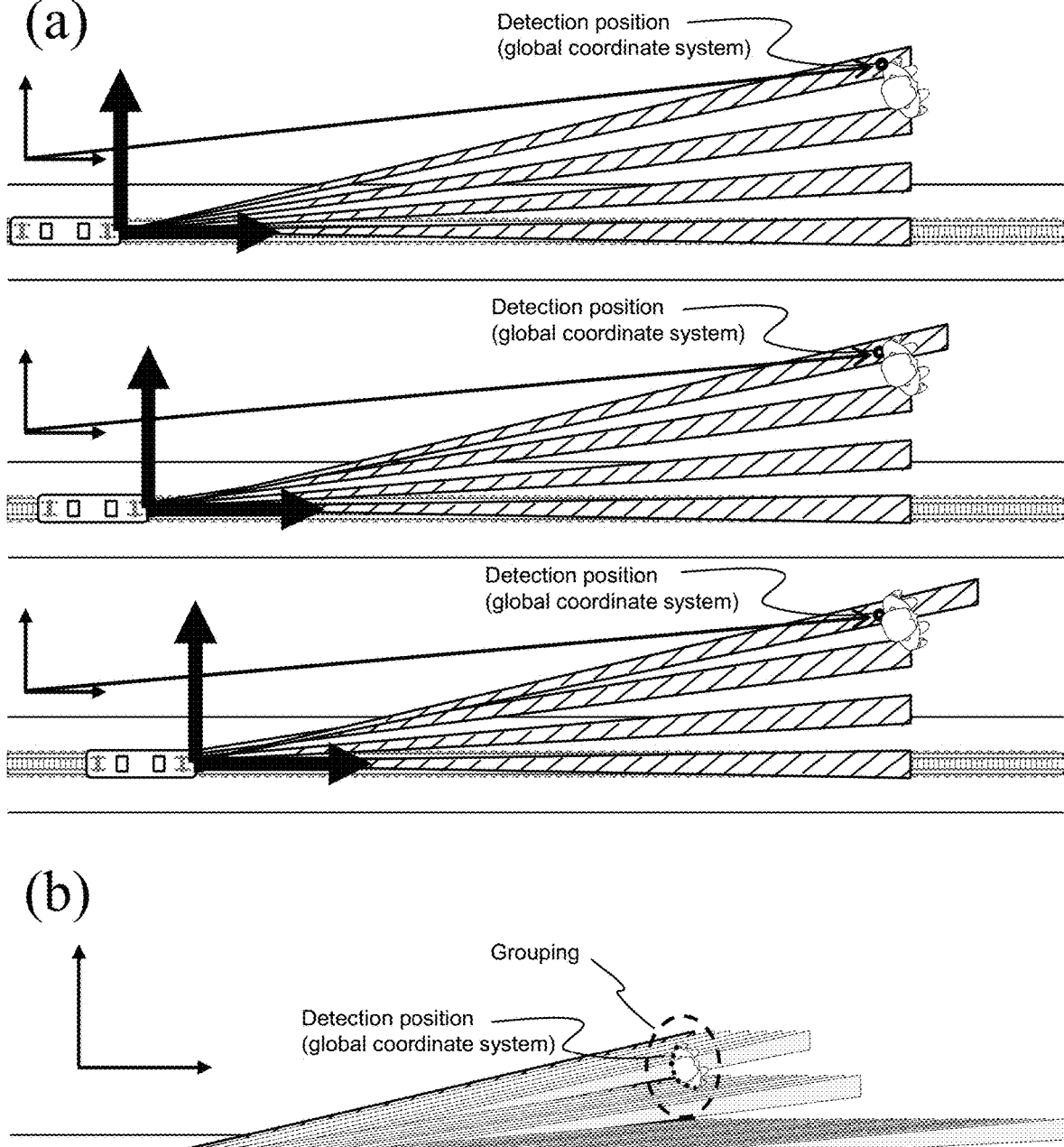
FIG. 15 is an explanatory diagram of grouping pieces of obstacle information in the obstacle detection system in the embodiment.

In Step 205, as illustrated in FIG. 15(*a*), after the detection position (vehicle coordinate system) is transformed into an external coordinate system, the detection positions (external coordinate system) corresponding to the number of times of sampling calculated in Step 203 are accumulated.

In Step 206, as illustrated in FIG. 15(*b*), the detection positions (external coordinate system) acquired and accumulated in all directions of the laser beam are grouped.

In Step 207, as illustrated in FIG. 16, the positions (external coordinate system) of the obstacles grouped in Step 206 are transformed into the vehicle coordinate system.

In Step 208, it is determined whether there is an obstacle in the obstacle monitoring area based on the obstacle information acquired in Step 207. When it is determined in Step 208 that there is the obstacle, the transport vehicle needs to be stopped, and thus obstacle detection information is created in Step 209. On the other hand, when it is determined that there is no obstacle, the process proceeds to Step 210.

In Step 210, the obstacle detection information in the obstacle monitoring area is transmitted to the transport vehicle 102.

The flow example of an obstacle detection operation performed by the obstacle detection system 103 has been described above.

Next, the operation of the self-position estimation system 101 will be described. FIG. 17 is a flowchart illustrating a processing procedure performed by the self-position estimation system 101.

In Steps 401 to 404, the self-position of the transport vehicle is estimated. This processing is performed for each measurement cycle of the obstacle detection system 103.

In Step 401, the surrounding environment observation data 151 observed by the surrounding environment observation unit 107 is acquired. Similarly to the obstacle detection system 103, the gap in the detection region of the sensors may be complemented with detection region from a plurality of positions due to the movement of the train.

In Step 402, the surrounding environment observation data acquired in Step 401 is sorted into observation data of a known object and observation data of other unknown objects.

In Step 403, the observation data of the known object is transformed from the vehicle coordinate system to the external coordinate system. The surrounding environment observation data 151 is transformed from the vehicle coordinate system $\Sigma_T$ fixed to the transport vehicle 102 into the external coordinate system $\Sigma_O$ in which the positions of the detection target object and the trajectory recorded in the detection target information database 110 and a trajectory information database 111 are defined.

In Step 404, the surrounding environment observation data in the external coordinate system $\Sigma_O$ calculated in Step 403 is matched with the surrounding environment map 152 recorded as the detection target data in the detection target information database 110, and the vehicle self-position on the trajectory recorded in the trajectory information database is estimated.

Figure 18:
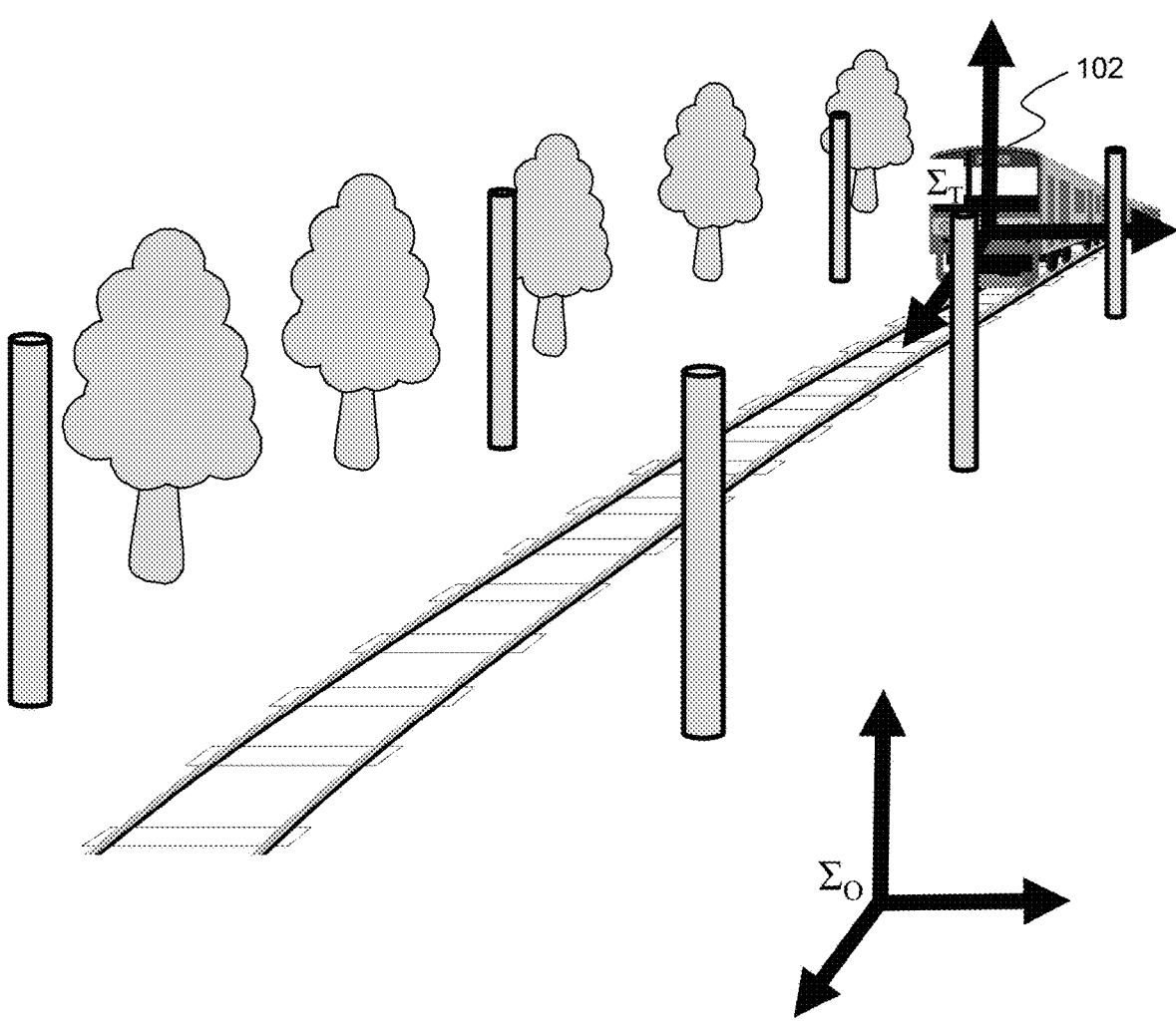
FIG. 18 is a diagram illustrating an example of a surrounding environment in which a transport vehicle travels in the embodiment.
Figure 19:
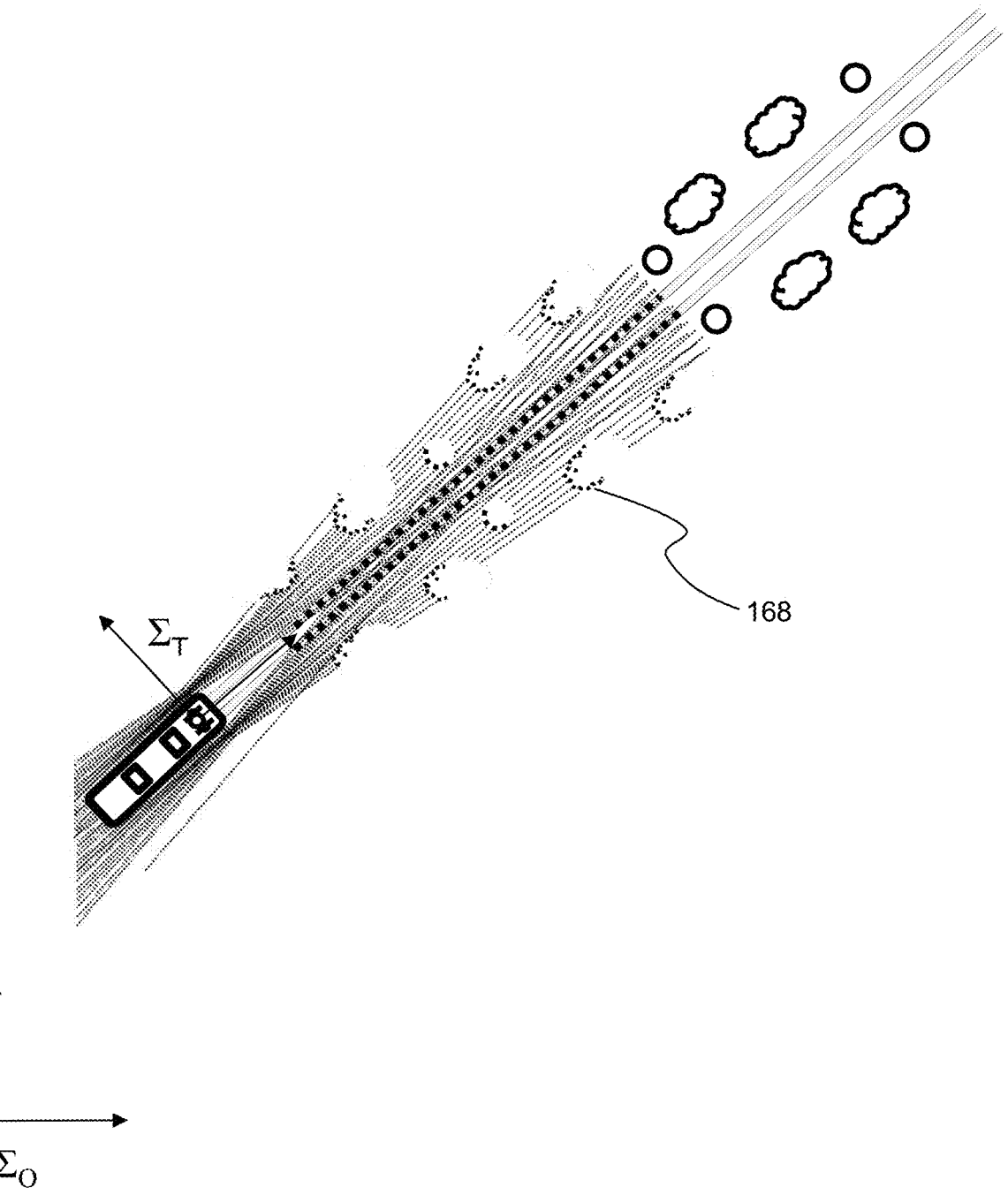
FIG. 19 is a diagram illustrating an example of surrounding environment observation data by the self-position estimation system in the embodiment.

In Step 404, for example, when the surrounding environment in FIG. 18 is observed by a multi-layer LIDAR, point cloud data defined by the external coordinate system $\Sigma_O$ as illustrated in FIG. 19 can be acquired.

Figure 20:
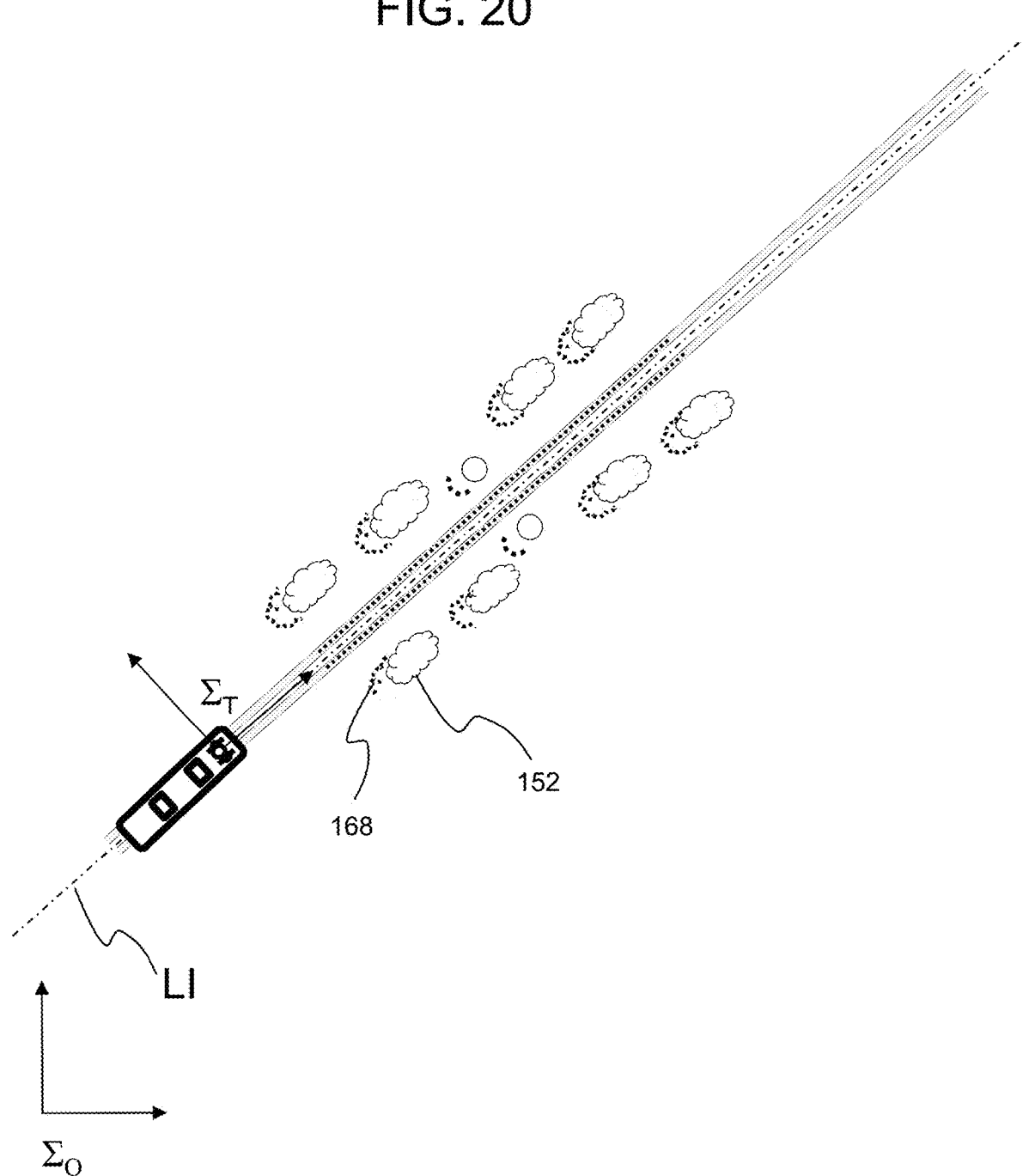
FIG. 20 is a diagram illustrating an example (before matching) of matching between the surrounding environment observation data and surrounding environment map data in the self-position estimation system in the embodiment.
Figure 22:
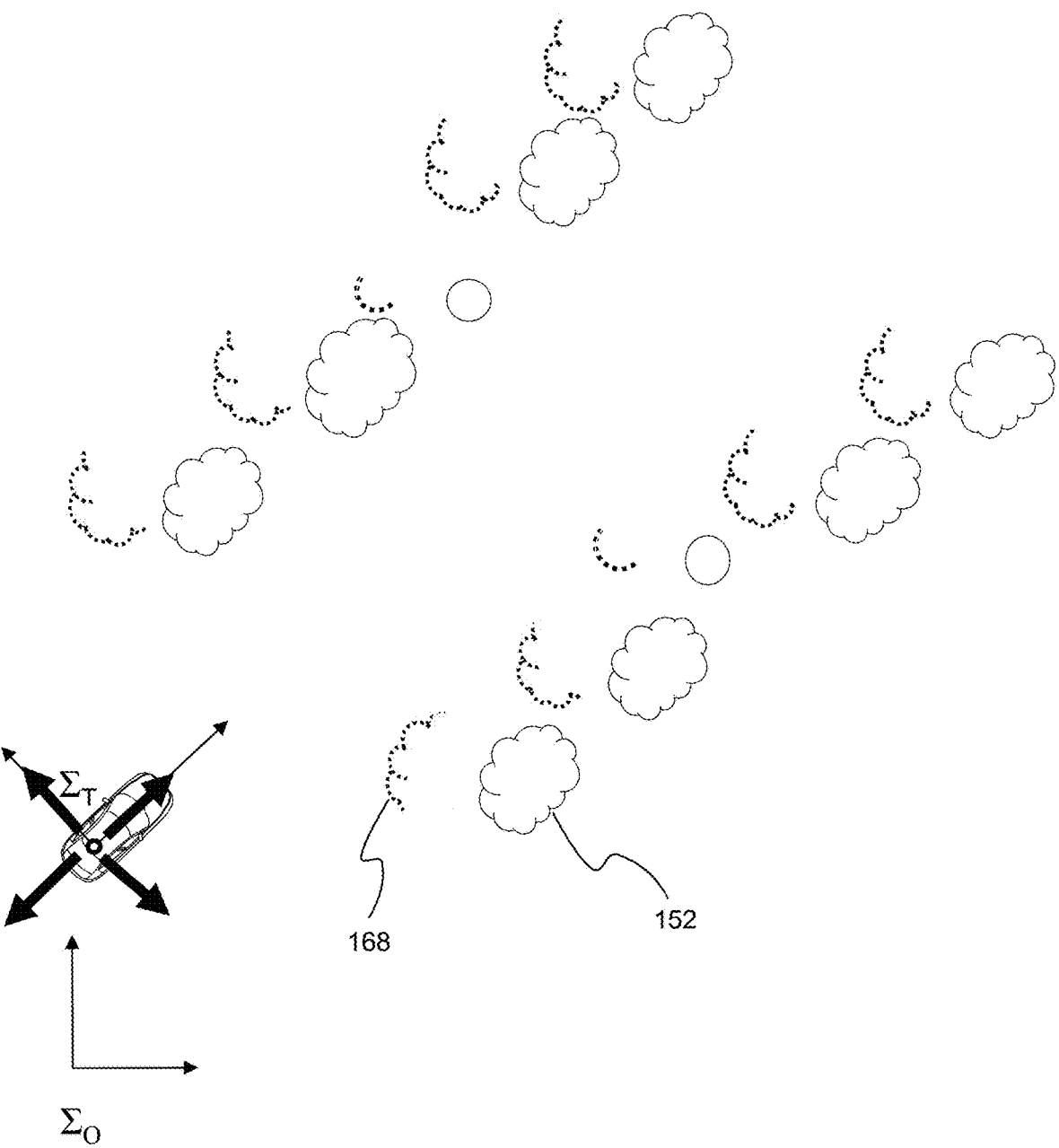
FIG. 22 is a diagram illustrating an example (before matching) of matching between the surrounding environment observation data and surrounding environment map data in the self-position estimation system of an automobile.
Figure 23:
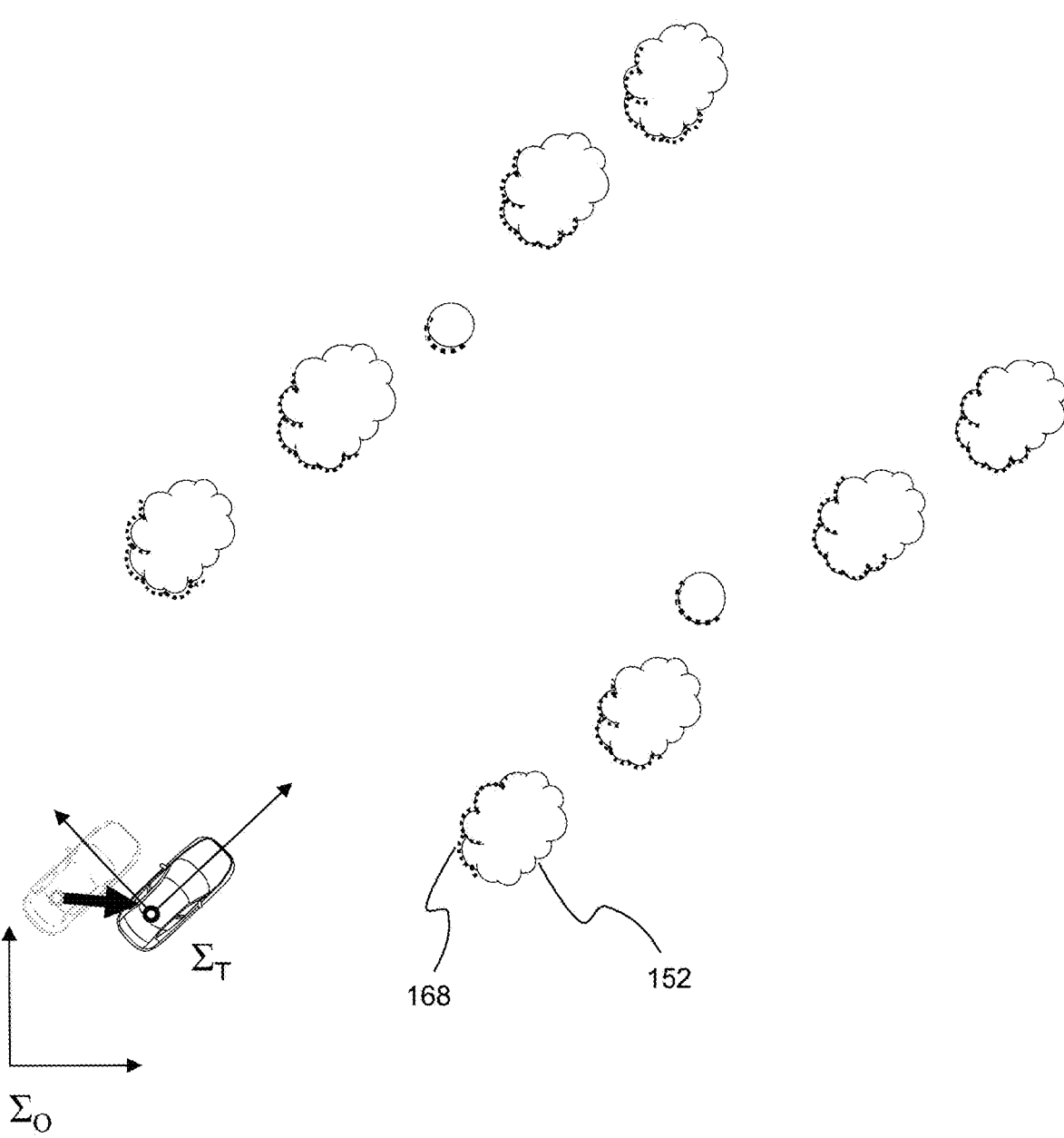
FIG. 23 is a diagram illustrating an example (after matching) of matching between the surrounding environment observation data and surrounding environment map data in the self-position estimation system of the automobile.

When the vehicle does not travel along a specific trajectory like an automobile, as illustrated in FIGS. 22 and 23, it is necessary to correlate the surrounding environment observation data 168 with the surrounding environment map while moving the vehicle in any direction, and to obtain the position (FIG. 23) having the highest correlation value as the self-position. On the other hand, here, the transport vehicle travels on the trajectory. Thus, the surrounding environment observation data 168 and the surrounding environment map 152 only need to be correlated with each other while moving on the trajectory LI in FIG. 20, and the position (FIG. 21) having the highest correlation value only needs to be obtained as the self-position. In addition, at this time, the estimated self-position is normally on the trajectory, and it is possible to prevent deviation of the estimated self-position from the trajectory and erroneous detection of an object outside the detection range, as in the influence of multipath in the case of using the GNSS.

The flow example of the self-position processing performed by the self-position estimation system 101 has been described above.

The obstacle detection system 103 and the trajectory transport system 100 have been described above.

The present invention is not limited to the above embodiment, and various modification examples may be provided. For example, the above embodiments are described in detail in order to explain the present invention in an easy-to-understand manner, and the above embodiments are not necessarily limited to a case including all the described configurations. Regarding some components in the embodiments, other components can be added, deleted, and replaced.

REFERENCE SIGNS LIST 100 trajectory transport system
101 self-position estimation system
102 transport vehicle
103 obstacle detection system
105 transport vehicle driving control unit
106 transport vehicle braking/driving unit
107 surrounding environment observation unit
108 detection range setting database
109 monitoring area setting processing unit
110 detection target information database
111 trajectory information database
112 front obstacle monitoring unit
113 obstacle detection unit
142 transport vehicle braking/driving command
151 surrounding environment observation data
152 surrounding environment map
153 transport vehicle position/speed information
154 obstacle detection range
155 detection target data in obstacle monitoring area
156 trajectory information
157 detection target data
159 front obstacle monitoring result
161 obstacle detection information
168 surrounding environment observation data
203 obstacle sensor

The invention claimed is:

1. An obstacle detection system comprising:
a monitoring area setting processing unit that sets an obstacle monitoring area for detecting an obstacle;
a front obstacle monitoring unit that monitors an obstacle within the obstacle monitoring area by using a sensor that horizontally scans a front of a train; and
an obstacle detection unit that detects an obstacle within the obstacle monitoring area based on a monitoring result of the front obstacle monitoring unit, wherein the front obstacle monitoring unit complements a gap in a detection region of the sensor at a first position with the detection region of the sensor while the train moves from the first position to a second position, wherein a distance between the first position and the second position is smaller than a product of a speed of the train and a time allowed to detect an obstacle.

2. The obstacle detection system according to claim 1, wherein a sensor that normally uses only a front direction of the train as a detection region is used in addition to the sensor that horizontally scans a front of the train.

3. The obstacle detection system according to claim 2, wherein, when a detection result within the obstacle monitoring area does not coincide with detection target data registered in a database, an obstacle is detected.

4. The obstacle detection system according to claim 3, wherein, when a known detection point having a detection rate equal to or higher than a threshold value is not detected, an obstacle is detected.

5. The obstacle detection system according to claim 3, wherein, when reflectances of known detection points having detection rates equal to or higher than a threshold value are different, an obstacle is detected.

6. The obstacle detection system according to claim 1, wherein, when a detection result within the obstacle monitoring area does not coincide with detection target data registered in a database, an obstacle is detected.

7. The obstacle detection system according to claim 6, wherein, when a known detection point having a detection rate equal to or higher than a threshold value is not detected, an obstacle is detected.

8. The obstacle detection system according to claim 6, wherein, when reflectances of known detection points having detection rates equal to or higher than a threshold value are different, an obstacle is detected.

9. The obstacle detection system according to claim 1, wherein, when a known detection point having a detection rate equal to or higher than a threshold value is not detected, an obstacle is detected.

10. The obstacle detection system according to claim 1, wherein, when reflectances of known detection points having detection rates equal to or higher than a threshold value are different, an obstacle is detected.

* * * * *